Sept. 13, 1955     A. A. KOTTMANN     2,717,560

COOKIE MACHINE

Original Filed May 6, 1950     8 Sheets-Sheet 1

INVENTOR
ARTHUR A. KOTTMANN
BY Evans & McCoy
ATTORNEYS

Sept. 13, 1955     A. A. KOTTMANN     2,717,560
COOKIE MACHINE

Original Filed May 6, 1950     8 Sheets-Sheet 2

INVENTOR
ARTHUR A. KOTTMANN
BY Evans & McCoy
ATTORNEYS

Sept. 13, 1955  A. A. KOTTMANN  2,717,560
COOKIE MACHINE
Original Filed May 6, 1950  8 Sheets-Sheet 4
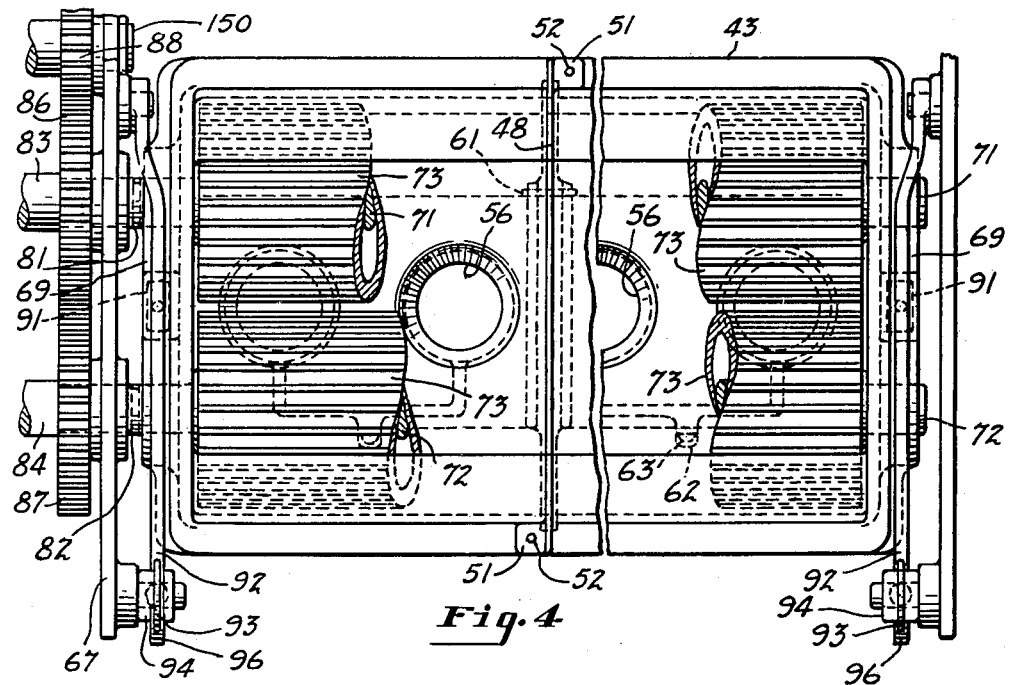
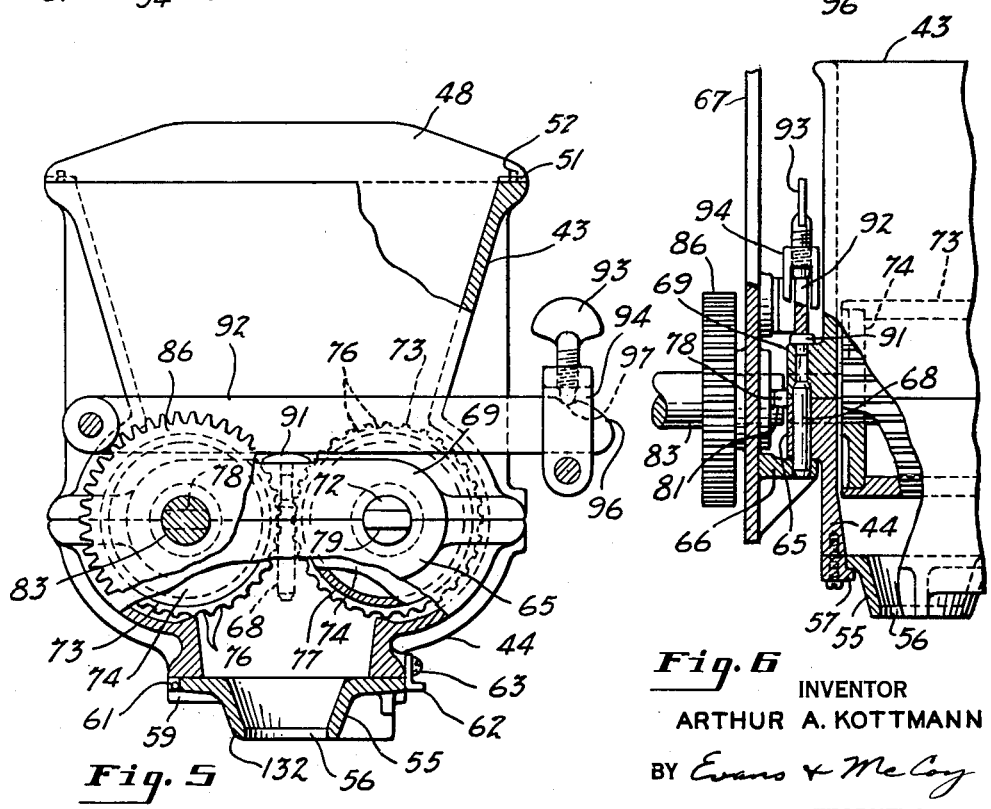
INVENTOR
ARTHUR A. KOTTMANN
ATTORNEYS Sept. 13, 1955        A. A. KOTTMANN        2,717,560
COOKIE MACHINE
Original Filed May 6, 1950        8 Sheets—Sheet 5
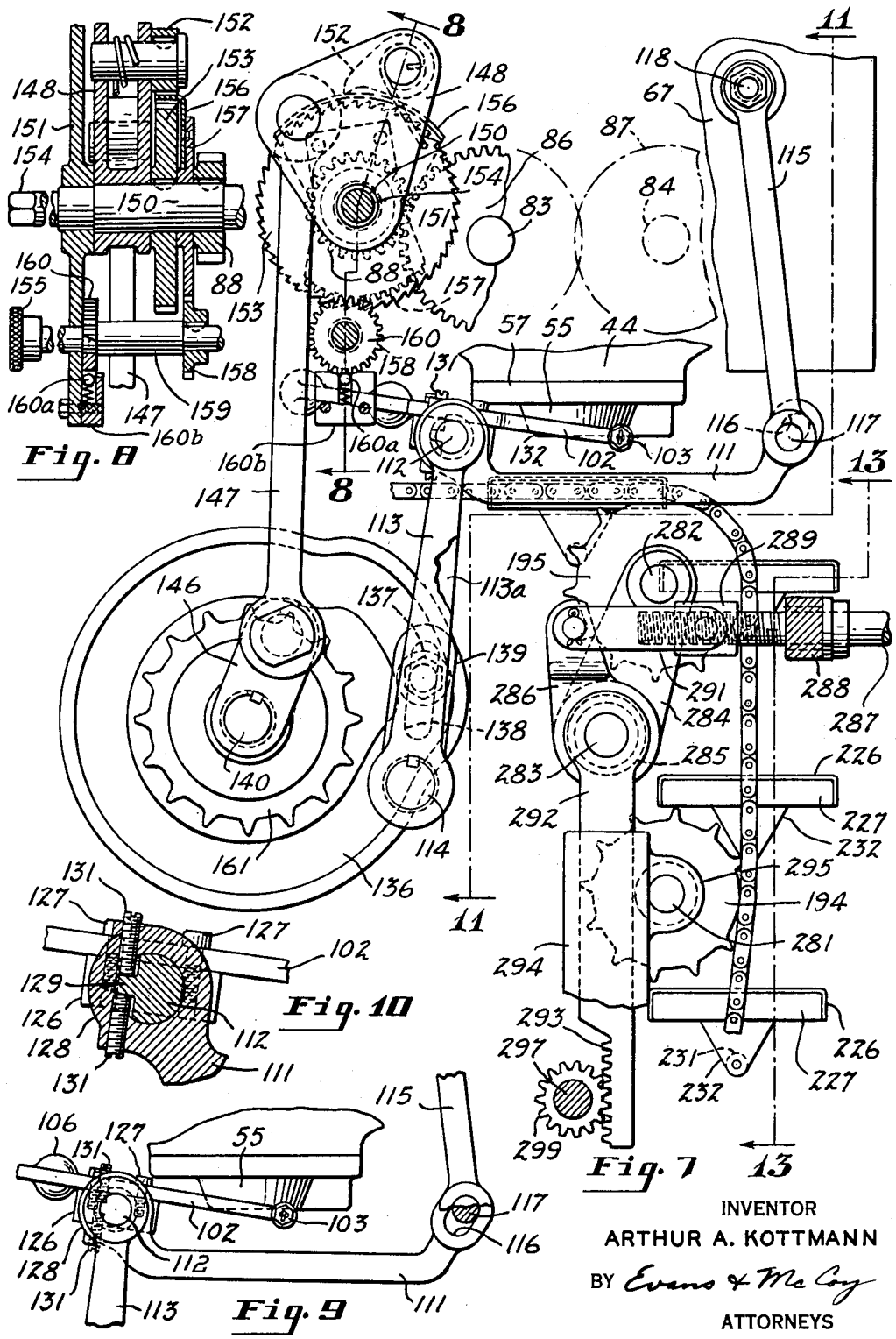
INVENTOR
ARTHUR A. KOTTMANN
BY Evans & McCoy
ATTORNEYS

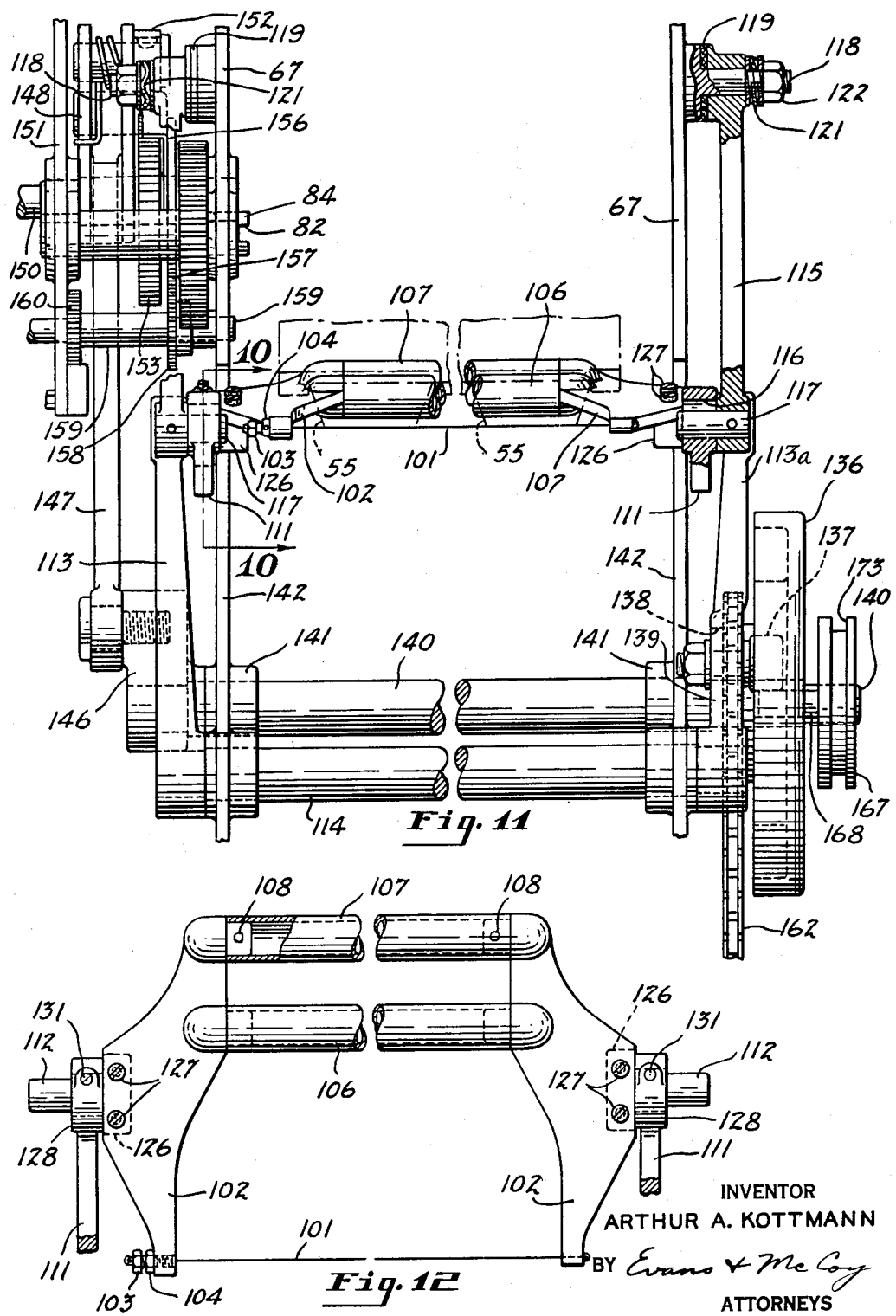

Sept. 13, 1955   A. A. KOTTMANN   2,717,560
COOKIE MACHINE
Original Filed May 6, 1950   8 Sheets-Sheet 7
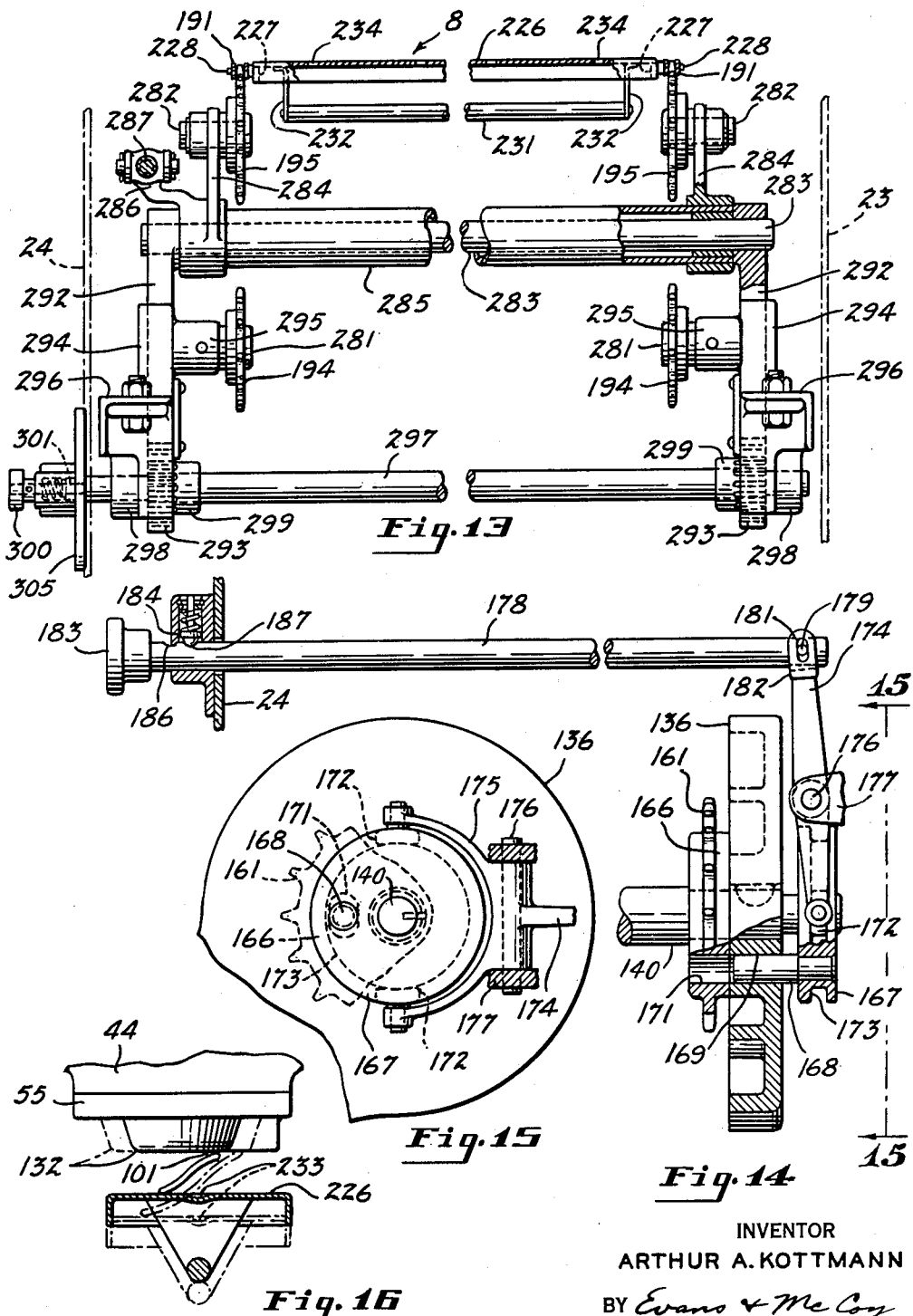
INVENTOR
ARTHUR A. KOTTMANN
BY Evans & McCoy
ATTORNEYS INVENTOR
ARTHUR A. KOTTMANN
BY Evans & McCoy
ATTORNEYS

United States Patent Office 2,717,560
Patented Sept. 13, 1955

2,717,560

COOKIE MACHINE

Arthur A. Kottmann, Davenport, Iowa, assignor, by mesne assignments, to Frank C. Wallace, Bettendorf, Iowa Original application May 6, 1950, Serial No. 160,501, now Patent No. 2,667,130, dated January 26, 1954. Divided and this application June 27, 1950, Serial No. 170,588

20 Claims. (Cl. 107—4)

This invention relates to automatic baking equipment for receiving a batter or dough and forming it and baking it during its passage through the machine to produce finished baked goods. More particularly the invention relates to an automatic machine for making cookies.

A general object of the invention is to provide an improved machine of the type adapted to feed formed dough from a hopper to an endless conveyor for passage through an oven in which the dough is baked to a suitable device for removing finished baked goods in condition for packaging or display.

Another object of the invention is to provide a design and arrangement of parts for a machine of the character mentioned which will permit the capacity of the machine to be altered by the manufacturer with a minimum number of changes in the various structural parts of the machine.

Another object of the invention is to provide an improved hopper and forming die assembly for receiving the dough or batter and extruding it into the desired form whereby the assembly may be easily taken apart for cleaning, and the dies may be individually or collectively removed for cleaning or for replacement with dies of other shapes or sizes.

Another object of the invention is to provide a hopper and forming die assembly having the foregoing advantages and also constructed to permit feeding several different types of dough or batter to different dies simultaneously.

Another object of the invention is to provide an improved arrangement of feed-rolls between the hopper and the dies for controlling the passage of dough or batter to the dies, and to provide an improved control for the rolls for synchronizing their operation with the cut-off mechanism.

Another object of the invention is to provide an improved type of tray for receiving the extruded dough from the hopper and conveying it through an oven and finally to a take-off mechanism while holding the dough securely against sliding off of the tray.

Another object of the invention is to provide an improved tray and conveyor assembly for moving the trays continuously along a closed path in uniformly spaced relationship without tilting the trays at any stage of their travel between the dough hopper and the take-off mechanism.

A further object of the invention is to provide improved adjustments for the tray and conveyor assembly for positioning the trays the proper distance below the dies and for timing the movement of trays under the dies in synchronism with the operation of the feed-rolls and the cut-off mechanism.

A further object of the invention is to provide an improved take-off device for removing baked cookies from the trays with a positive action and with a minimum breakage of the cookies.

Still a further object of the invention is to provide means for cooling the cookies as they emerge from the oven to facilitate removal of the cookies from the trays, and to continue the cooling function at as rapid a rate as possible during travel of the cookies along an auxiliary conveyor to a point where they are collected, either by hand or by any suitable stacking device, or the like.

Still other objects and advantages of the invention will become apparent from the following specification and from the accompanying drawings in which a preferred embodiment of the invention is illustrated.

Referring to the drawings:

Fig. 4 is a fragmentary plan view, on a still further enlarged scale, showing the dough hopper, feed-rolls, and forming dies.

Fig. 5 is a side elevation of the dough hopper and associated parts, on the same scale as Fig. 4, portions of the hopper and associated parts being broken away or omitted to show the interior construction;

Fig. 6 is a fragmentary end elevation of the dough hopper and associated parts, on the same scale as Figs. 4 and 5, portions of the mechanism being broken away to show how the feed-rolls are mounted and driven;

Fig. 7 is a fragmentary side elevation, on the same scale as Figs. 4 to 6, showing the drives for the hopper feed-rolls and the cut-off mechanism, and also showing the mechanism for positioning the path of travel of the cookie trays the desired distance below the forming dies and for adjusting the positions of the trays along their path of travel with reference to the timing of the feed-rolls and the cut-off mechanism;

Fig. 8 is a section taken as indicated by the line 8—8 in Fig. 7;

Fig. 9 is a fragmentary side elevation, similar to a portion of Fig. 7, but showing the parts in positions corresponding to a different stage in their cycle of operation;

Fig. 10 is a vertical section on a further enlarged scale through a portion of the mechanism of Fig. 9, the section being taken as indicated by the line 10—10 in Fig. 11;

Fig. 11 is an end elevation, on the same scale as Figs. 4 to 9, showing a portion of the mechanism of Fig. 7 viewed as indicated by the line 11—11 in Fig. 7;

Fig. 12 is a plan view of the cut-off mechanism, on the same scale as Figs. 4 to 9;

Fig. 13 is an end elevation, on a scale reduced with respect to Figs. 4 to 9, showing the mechanism for positioning the path of travel of the trays the desired distance below the forming dies and for adjusting the positions of the trays along their path of travel with respect to the timing of the feed-rolls and the cut-off mechanism, the view being taken as indicated by the line 13—13 in Fig. 7 and certain parts being broken away;

Fig. 14 is a plan view, partly in section, of a positive clutch mechanism for engaging and disengaging the drive for the hopper feed-rolls and the cut-off mechanism.

Fig. 15 is a side elevation of a portion of the mechanism of Fig. 14, taken as indicated by the line 15—15 in Fig. 14.

Figure 1:
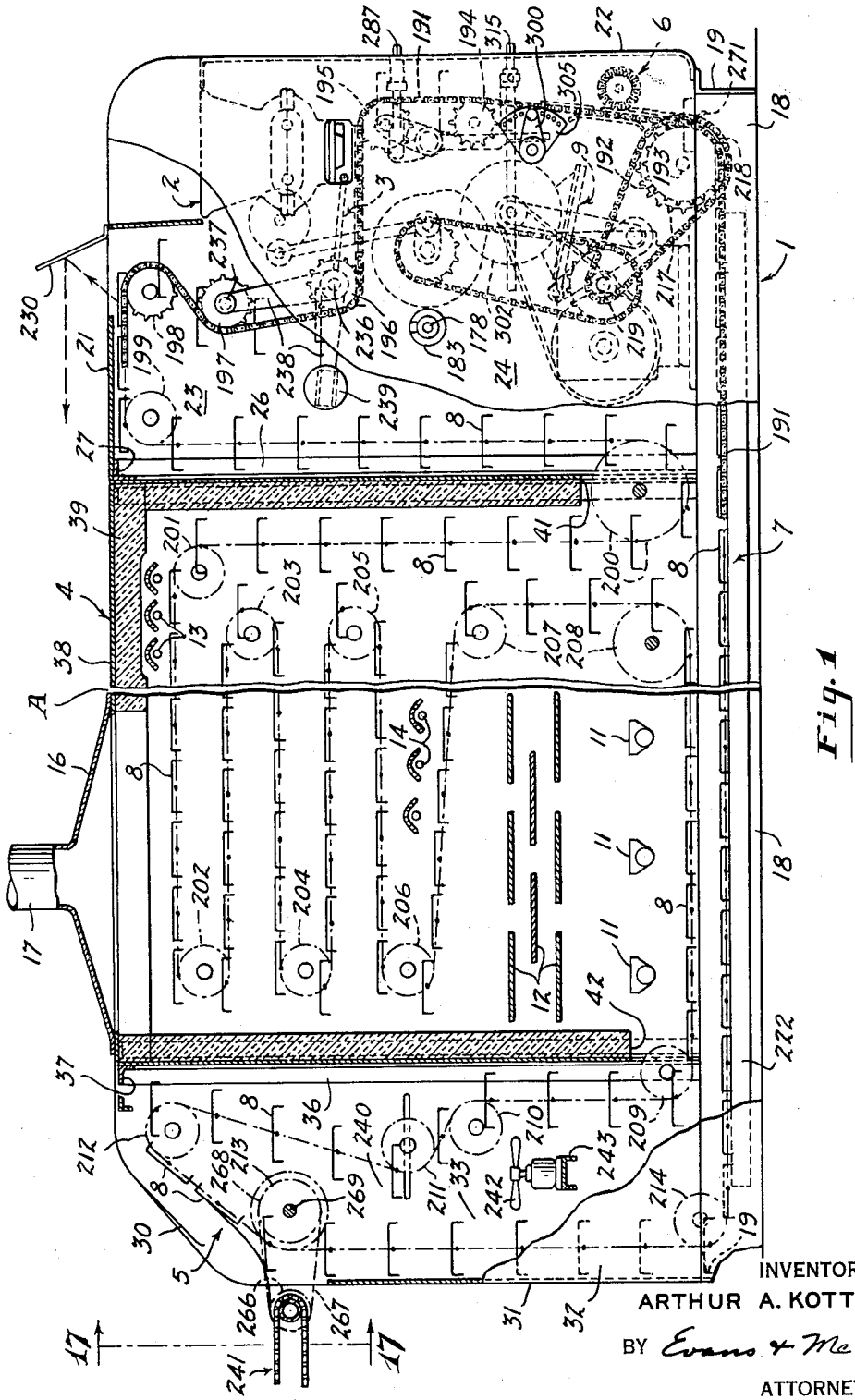
Figure 1 is a side elevation of the machine with certain portions broken away and others shown in section, the general arrangement of the moving mechanical parts contained therein being shown somewhat diagrammatically with numerous details being omitted for simplicity.
Figure 2:
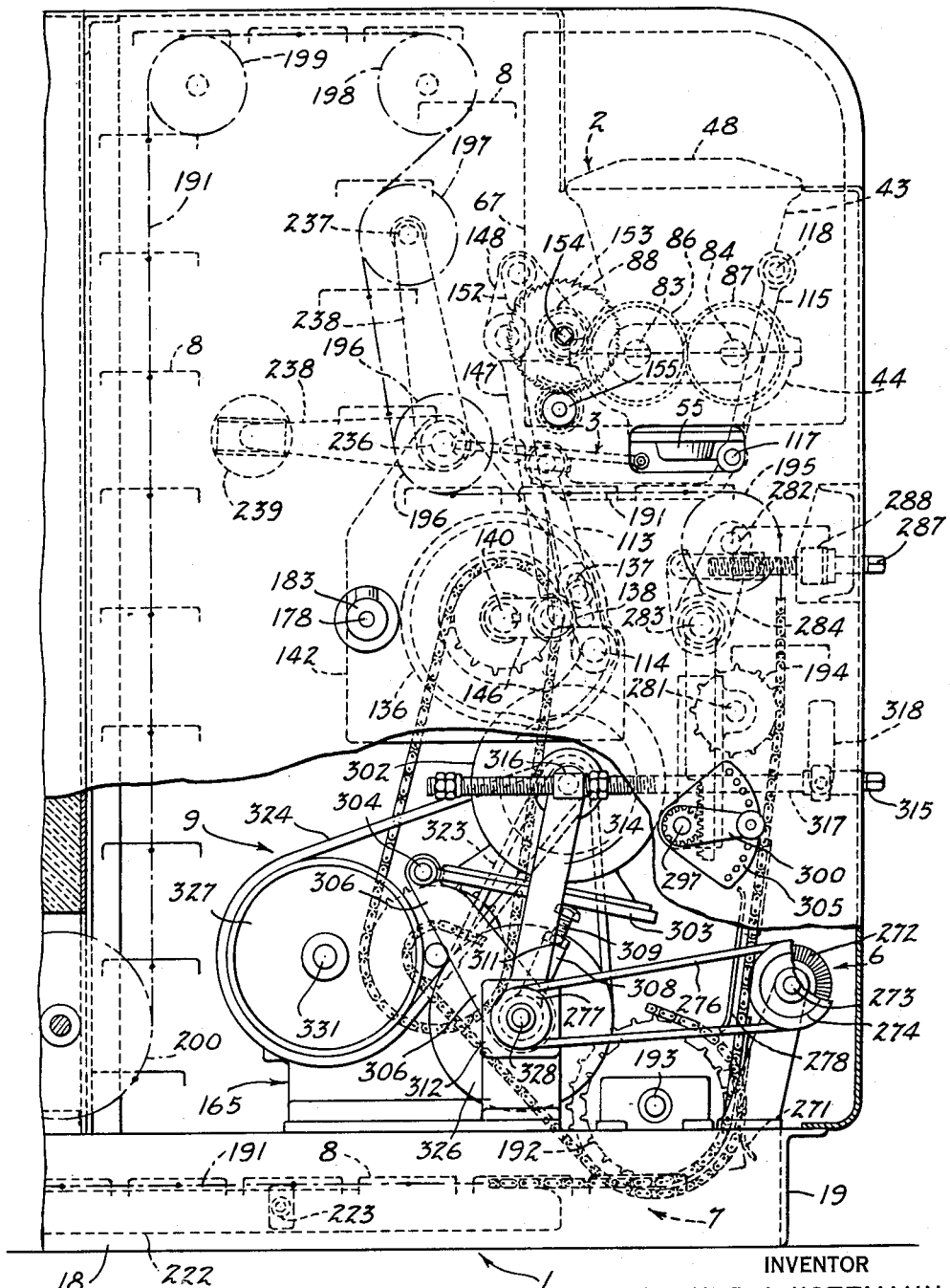
Fig. 2 is a fragmentary side elevation of the machine, on an enlarged scale, with a portion of the housing broken away to show details of the power mechanism and its association with the various individual mechanisms driven thereby.
Figure 3:
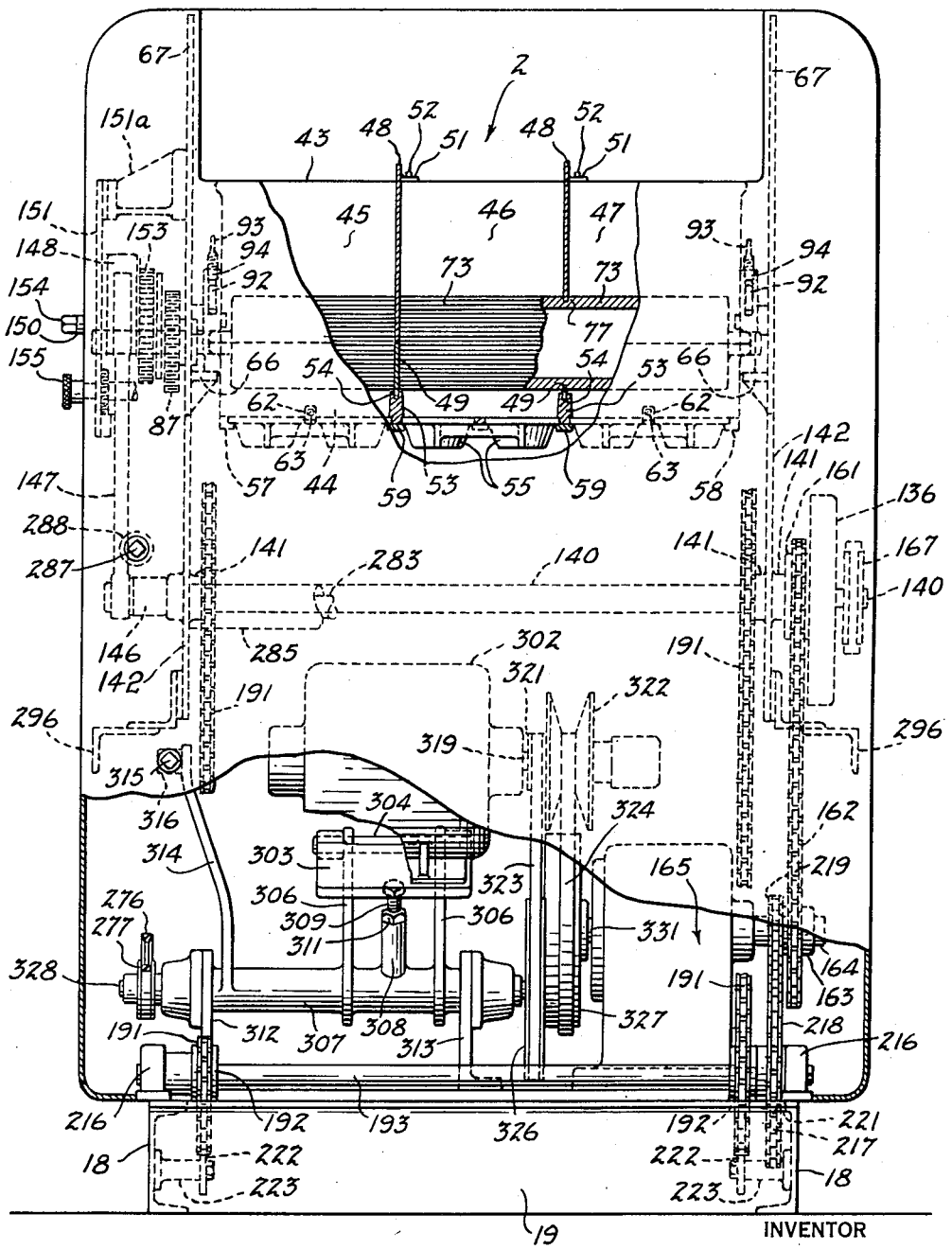
Fig. 3 is an end elevation of the machine, on the same scale as Fig. 2, with a portion of the housing broken away to show further details of the power mechanism and its association with the various individual mechanisms driven thereby.
Figure 17:
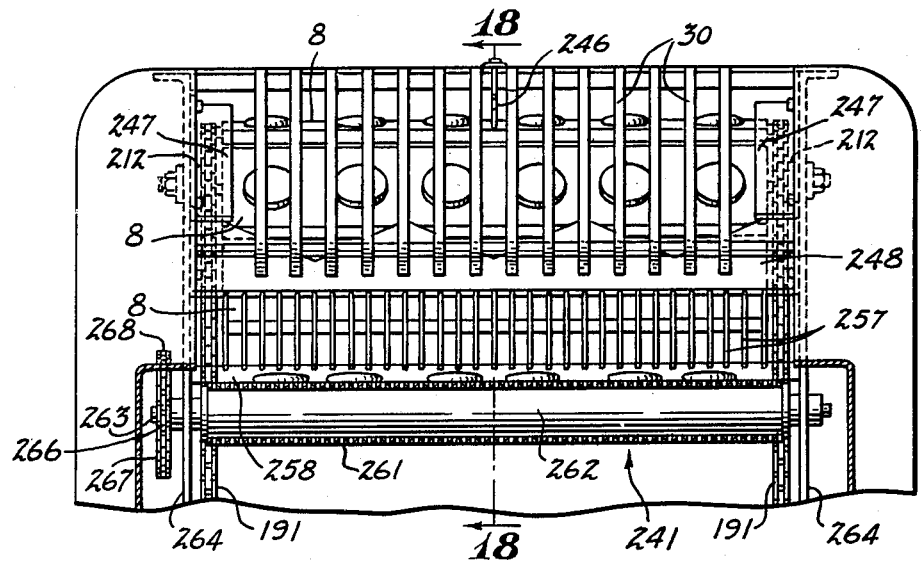
Figure 19:
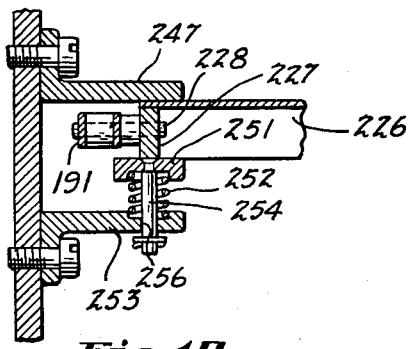
Figure 18:
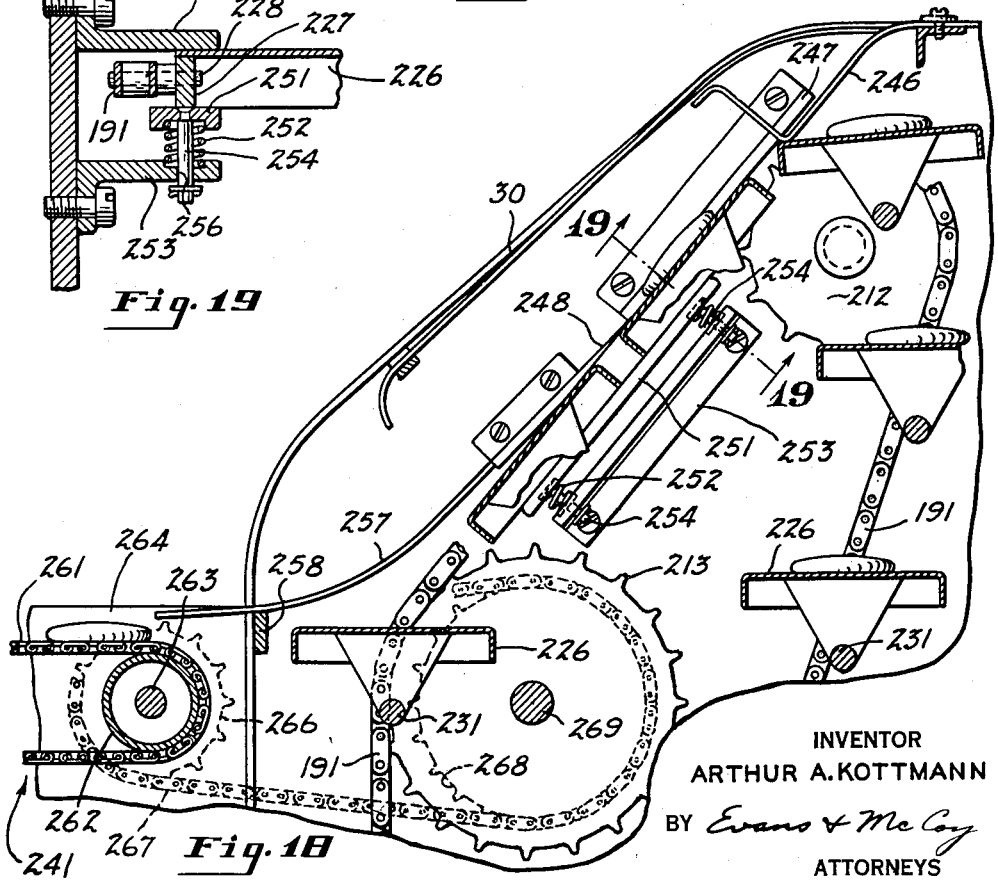

Fig. 16 is a fragmentary side elevation, similar to a portion of Fig. 7, showing in solid lines the relationship between a slightly modified tray, the cut-off mechanism, and a relatively small die as a cut is being completed, and showing in phantom outline the corresponding relationships when employing a larger die for producing cookies of a greater diameter;

Fig. 17 is a fragmentary end elevation taken as indicated by the line 17—17 in Fig. 1 and showing the take-off mechanism on the same scale as Figs. 2 and 3;

Fig. 18 is an enlarged, fragmentary, vertical section through the take-off mechanism, taken as indicated by the line 18—18 in Fig. 17; and Fig. 19 is a section on a still further enlarged scale taken as indicated by the line 19—19 in Fig. 18.

Referring principally to Fig. 1, the machine shown therein is substantially rectangular in profile, having a generally flat top about shoulder high to an average size man. This form is preferred from the appearance viewpoint and also to permit an operator to stand at one end of the machine and see over the top thereof to the opposite end. The functional units of the machine, shown diagrammatically in Fig. 1 for simplicity, are all supported on a unitary base structure 1 and are preferably enclosed by a shell or housing having suitable side, end, and top panels, as described in more detail hereinafter.

The principal functional units of the machine comprise a dough hopper 2 equipped with feed-rolls and dough forming dies; an associated cut-off mechanism 3 (Figs. 2, 7, 9, and 10) for cutting the dough emerging from the forming dies; an oven 4; a take-off device 5; a tray cleaning brush 6; an endless chain conveyor 7 that carries a multiplicity of trays 8, in uniformly spaced apart relationship, from the hopper 2, into and through the oven 4, to the take-off device 5, and thence to the cleaning brush 6 and back to the hopper 2; and a common power mechanism 9 (Figs. 2 and 3) for driving the hopper feed-rolls, the cut-off mechanism 3, the brush 6, and the conveyor 7.

With machines of the character shown in Fig. 1, the capacity of the machine is controlled by the baking time required for a particular type of cookie to be produced. Since the oven space above the source of heat is substantially filled with trays 8 moving along a switch-back path, the length of the conveyor path within an oven of a given size cannot be increased to permit speeding up the conveyor 7. Thus, if the elapsed time during which a particular tray remains in the oven is to be kept constant, the capacity of the machine (represented by the width of the trays and the speed of the conveyor) can only be increased by substituting a larger oven to provide a longer path of travel for the trays within the oven and permit movement of the trays at a higher speed, or by increasing the width of the machine to accommodate wider trays. The first of these alternatives is the only practical one from the standpoint of economy of manufacture, for the second alternative would require altering the dimensions of every functional unit in the entire machine for each change in the capacity of the machine.

A feature of this invention, therefore, resides in the general arrangement and relationship of the various parts of the machine to permit the manufacturer to make machines of different capacities by merely employing ovens of different lengths and by varying the length of base 1 and the length and speed of travel of the conveyor 7 accordingly, without materially altering any of the other functional units of the machine. The speed of the conveyor 7 may be increased or decreased in this manner for varying the capacity of the machine while keeping the critical baking time unchanged. To illustrate in the drawings how the machine is adapted for the substitution of ovens of varying lengths, the oven 4 and the several horizontal reaches of the conveyor 7 within the oven are shown broken transversely at A, and similar breaks are shown in the base 1 and in the conveyor 7.

The oven contains suitable apparatus for supplying and distributing heat, such as conventional gas burners 11 and an arrangement of heat distributing baffles 12. Electrical or gas flash heaters may also be disposed where needed within the oven. A preferred arrangement of flash heaters includes a plurality of heating units 13 at the top of the oven for setting a skin on the dough quickly as the trays begin their horizontal travel through the hot zone of the oven, and a plurality of additional heating units 14 disposed above the lowermost horizontal reach of the conveyor within the oven for browning the cookies before they leave the oven. The number of burners, baffles, and flash heaters and their distribution in the oven should be varied, of course, with changes in the length of the oven and in the speed of travel of the trays therethrough. The oven is also equipped with a flue hood 16 and a flue pipe 17 for conveying gaseous products of combustion away from the oven.

Since the structural details of the oven itself form no part of the present invention, most of the structure of the oven and the equipment contained therein is merely shown diagrammatically in the drawings (Fig. 1). Only those details of the oven frame that are deemed essential to a clear understanding of the above described feature of the invention are shown.

Referring now to the structure of the machine in more detail, the base 1 may comprise a pair of longitudinally extending channel members 18 and suitable transverse braces 19. The portion of the frame surrounding the hopper 2, the power mechanism 9, and the various parts associated therewith may be any suitable self-sustaining structure for supporting an enclosing shell or housing. Such a shell may comprise a top panel 21, an end panel 22, and opposite side panels 23 and 24. Adjacent the oven 4, the top and side panels 21, 23, and 24 are preferably secured to suitable vertical frame members 26 (only one being shown) that may be welded to the base channel members 18 and connected at their upper ends by a transverse frame member 27. These frame members may be of any suitable form such as the angle members shown.

The mechanical parts beyond the oven at the opposite end of the machine are preferably similarly enclosed, as by a top grillwork panel 30 (Fig. 17), an end panel 31, and opposite side panels 32 and 33, preferably having screen windows therein (not shown) to obtain adequate air circulation. These panels may be supported by any suitable self-sustaining frame structure and may include vertical angle members 36 (only one being shown) welded at their lower ends to the base channel members 18 and connected at their upper ends by a transverse angle member 37.

The oven 4 may be of any suitable design, as indicated above, but will generally include an enclosing shell or housing such as 38 lined with suitable insulating material 39.

The oven structure should be of an appropriate length to fill the space between the vertical frame members 26 toward one end of the machine and the vertical frame members 36 toward the opposite end of the machine. It is preferably constructed as an independent, self-sustaining unit and may rest upon the base channel members 18 and be bolted or otherwise suitably secured to the vertical frame members 26 and 36. The oven shell 38 should provide an opening 41 at one end large enough to permit the conveyor 7 to enter the oven at the bottom and with another opening 42 at its opposite end to permit the conveyor to leave the oven at the bottom.

With the general arrangement described above, the machine may be designed to receive ovens of any desired length merely by constructing the machine upon a base of sufficient length to accommodate the oven between the vertical frame members 26 and 36.

Referring next to the hopper 2 and its associated parts (Figs. 4, 5, and 6), the longitudinal dimension of the hopper will, for convenience, be considered as extending transversely of the machine, and the following descriptive text will be phrased accordingly. The hopper frame comprises an upper, dough-receiving, housing section 43 and a lower, feed-roll housing section 44, each preferably being formed as a unitary casting. The upper housing section 43 defines a dough-holding chamber and is preferably divided into any desired number of compartments, such as the compartments 45, 46, and 47, by upper transverse division plates or partitions 48 and lower transverse division plates or partitions 49. Each of the upper division plates 48 is shaped to conform to and abut against the downwardly converging side walls of the upper housing section; and each preferably extends somewhat above the top edges of the upper housing section and may be held in place by a pair of oppositely turned-out ears 51 drilled to fit over dowel pins 52 anchored in the opposite upper edges of the upper housing section.

The lower transverse division plates 49 are respectively aligned and abut edgewise with the upper division plates 48 to continue the compartment divisions down through an outlet passage extending to the bottom of the hopper. The lower division plates may be supported on transversely extending ribs 53 of the lower housing section and held aligned therewith by dowel pins 54 welded in the lower edges of the partitions.

The bottom of the lower housing section slidably receives a plurality of dough forming dies 55, preferably corresponding in number and length to the compartments 45, 46, and 47. As shown, each of the dies extends the full length of the associated compartment and may be provided with any desired number of extrusion openings 56. The number of extrusion openings 56 may be different in each die if desired, and the shapes of the openings may also be varied to produce with one cut a desired number of cookies of assorted shapes and sizes; or, of course, if a large number of identical cookies are required, the three dies 55 may be identical as shown in the drawing. All dies to be employed in the machine should have their orifices at the same level and in alignment longitudinally of the hopper, at least with respect to the edges thereof away from the cut-off mechanism, as explained more fully hereinafter.

The dies are shown as being slidable into place from the right hand end of the machine, as viewed in Fig. 1, and transversely extending guide bars 57 and 58 are bolted or otherwise secured to the ends of the bottom of the lower housing section 44 for this purpose. Intermediate, transversely extending, guide bars 59 are also secured to the bottom of the lower housing section in vertical alignment with the hopper ribs 53 (Fig. 3), and each serves to support and guide the adjacent edges of two of the dies. The movement of the dies into position is limited by stop pins 61 (Figs. 4 and 5), which may be set into the intermediate guide bars 59, and the dies may be securely held in place by clamps, such as the clamp 62, suitably mounted on the lower hopper section by fastening elements 63.

The lower housing section 44 supports the upper housing section 43, as will hereinafter be described, and is in turn supported at its opposite ends by integrally cast bosses 65 that rest on brackets 66 secured to frame plates 67 at opposite sides of the machine (Figs. 4 and 6—plates 67 being omitted from Fig. 5 for clarity). The lower housing section is locked in place by dowel pins 68, one of which is anchored in each of the bosses 65 at opposite ends of the hopper. Each dowel pin 68 projects downwardly into the associated bracket 66 and also projects upwardly into a boss 69 cast integrally with the upper housing section 43 for securely positioning the upper housing section on the lower housing section.

The upper housing section 43 and the lower housing section 44 each define half of a feed-roll chamber communicating with the dough receiving chamber by way of a longitudinally extending opening of less width than the feed-roll chamber. Pairs of mating hemispherical bearing halves are formed in the bosses 65 and 69 at each end of the upper and lower housing sections to accommodate a pair of parallel feed-roll shafts 71 and 72 that extend longitudinally through the hopper and have identical feed-rolls 73 respectively mounted thereon to turn therewith within the feed-roll chamber. Preferably each of the feed-rolls 73 is a hollow tube that extends substantially the full length of the feed-roll chamber and is closed at its ends by discs, such as the disc 74 (Fig. 6), pressed tightly or welded onto the associated shaft and welded in the ends of the roll tubes. The outer surfaces of the roll tubes are longitudinally grooved at uniformly spaced intervals entirely around their circumference, as shown at 76, to catch the dough and drag it downwardly between the rolls as they turn in opposite directions with their respective shafts. At each of the upper and lower compartment division plates, the rolls are circumferentially grooved, as shown at 77 (Fig. 3), to a depth equal to or, preferably, slightly greater than the depth of the longitudinal grooves 76, and edges of the division plates are shaped to fit into these grooves to prevent dough from seeping longitudinally from one compartment to another.

At one end of the hopper, the feed-roll shafts 71 and 72 are provided with integral end lugs 78 and 79 adapted to be received in driving engagement by corresponding slots 81 and 82, respectively, in the ends of a pair of stub drive shafts 83 and 84. The stub shafts 83 and 84, respectively, carry identical meshing gears 86 and 87, whereby rotation of the stub shaft 83 in one direction imparts rotation to the other stub shaft 84 in the opposite direction at the same speed. The stub shaft 83 is driven by power applied through a small gear 88 as hereinafter described.

As noted above, each end of the hopper is shown as being provided with a pair of projecting bosses 65 and 69 on the lower and upper housing sections, respectively, held in alignment by a centrally disposed dowel pin 68. A pin 91 in each boss 69, having a button shaped head, provides a bearing surface for a clamping arm 92 adapted to hold the adjacent end of the upper hopper section downwardly in secure engagement with the lower hopper section. The clamping arm 92 may be pivotally mounted at one end on the adjacent frame plate 67 for pivotal movement in a vertical plane passing through the center of the button head pin 91. The clamping arm 92 may be held downwardly against the pin 91 by means of a thumb screw 93 in a bracket 94, also pivotally mounted on the frame plate 67. This adjacent end of the clamping arm 92 is shaped to provide a cam surface 96 having a notch 97 therein whereby the bracket 94 may be manually swung into position with the bearing end of the thumb screw sliding over the cam surface of the clamping arm in a counter-clockwise direction, as viewed in Fig. 5, until the bearing end of the thumb screw snaps into the notch 97. The thumb screw may then be manually tightened to bring the clamping arm tightly down into engagement with the head of the pin 91. Each end of the upper housing section 43 may thus be clamped securely in place and yet be easily removable.

As will be apparent from the foregoing description of the construction of the hopper 2, the upper housing section 43 may be lifted upwardly and removed after freeing the clamping arms 92. This exposes both of the feed-rolls 73, which are then also free to be lifted upwardly, with slight endwise movement away from their respective drive shafts 83 and 84, whereby the lugs 78 and 79 are withdrawn from the drive shaft slots 81 and 82 as the feed rolls are removed from the hopper. This in turn permits the lower division plates 49 to be withdrawn. The dies 55 may be individually removed after loosening the clamps 62 and swinging them about their respective fastening elements 63; or the entire lower housing section 44 may be directly lifted from the machine before removing the dies. The ease and rapidity with which the hopper may be disassembled is highly desirable to permit thorough cleaning of the various hopper parts with a minimum of time and effort. Also, the provision for removing the dies individually from the end of the machine permits the dies to be changed at will without removing any of the other parts of the hopper whenever it is desired to change the sizes and shapes of cookies being produced from a given batch of dough.

Turning now to the cut-off mechanism 3 by which dough emerging from the dies is sliced into cookie shapes of the desired thickness, a reciprocating cutting wire 101 that extends continuously under the hopper from end to end thereof may be held at its opposite ends in a frame best shown in Figs. 7 and 9 to 11.

The cutting wire frame may comprise a pair of complementary arms 102 between which the wire 101 is stretched and tightened by means of a hollow bolt 103 threaded into one of the arms. The wire is knotted or otherwise provided with enlarged stops at its opposite ends and passes through the ends of both arms and through the hollow bolt 103 in one of the arms. The bolt 103 may be backed out of the arm in which it is threaded until the wire is drawn sufficiently taut, and a lock nut 104 on the hollow bolt 103 is employed to prevent reverse turning of the hollow bolt during operation of the machine.

The arms 102, toward their opposite ends from the wire 101, are held apart by a strut 106 which may take the form of a tube fitted freely over bosses formed on the arms. Beyond the strut 106, the arms 102 are pulled together to balance the tension in the wire 101 by means of a tension member, such as the tube 107, which may also fit over bosses formed on the arms 102 and be secured thereto by pins 108.

Referring to the near side of the machine as viewed in the various side elevational views of the drawings, the arm 102 may be adjustably mounted between its ends on a link 111 of a linkage system designed to move the wire 101 along substantially horizontal paths during its cutting and return strokes. The link 111 is pivotally mounted at one end by means of a stub shaft 112 to the upper end of an actuating lever 113 that is keyed to a rocker shaft 114 extending transversely of the machine from side to side thereof. The rocker shaft 114 may be journaled adjacent its opposite ends in a pair of side plates 142 (Figs. 2 and 11) which may be secured to or constitute a part of the frame of the machine carried by the base 1. For simplicity, many details of the machine frame have been omitted from the drawings. The opposite end of the link 111 is pivotally connected to a guide lever 115 by means of a pin and slot connection comprising a slot 116 disposed in the link 111 at an acute angle to the horizontal, and a pin 117 in the guide lever 115. The guide lever 115 is mounted to swing against frictional resistance from a stub shaft 118 carried by the adjacent frame plate 67. Frictional resistance to swinging of the guide lever 115 is provided at the stub shaft 118 by means of a friction disc or washer 119 against which the end of the guide lever is pressed by a disc spring 121 compressed by a nut 122. Thus when the actuating lever 113 swings in a clockwise direction, as viewed in Fig. 7, the lower end of the slot 116 is forced against the pin 117 in driving the guide lever 115 counter-clockwise against frictional resistance. When the actuating lever 113 swings in a counter-clockwise direction, the upper end of the slot 116 is pulled downwardly against the pin 117 (Fig. 9) and pulls the guide lever 115 in a clockwise direction against frictional resistance.

The actuating lever 113 and the guide lever 115 are of the same effective length, and when the pin 117 and slot 116 are coacting as shown in Fig. 7, the effective length of the connecting link 111 along its pivotal or longitudinal center line is such that the longitudinal center lines of both the actuating lever and the guide lever are vertical and normal to the pivotal center line of the link 111 at the same instant during their oscillation. With this relationship existing, the midpoint of the pivotal center line of the link 111 will travel along a horizontal path while the actuating lever 113 is swinging clockwise.

The actuating lever 113a on the opposite side of the machine differs slightly in shape from the actuating lever 113 for reasons hereinafter explained. In other respects, the above described linkage system is duplicated on opposite sides of the machine so that the midpoints of the pivotal center lines of the two links 111 define a horizontal line that travels under the dies on the hopper 2 at substantially the same level as the lower ends of the dies while the actuating levers 113 and 113a are swinging clockwise. By mounting the cutting wire frame so that the cutting wire coincides with the line between these midpoints of the pivotal center lines of the links 111, the cutting wire will travel on a cutting stroke along a horizontal path at substantially the level of the lower ends of the dies. When the actuating levers 113 and 113a are swung counter-clockwise, as viewed in Fig. 7, and the upper ends of the slots 116 are pulled downwardly onto the pins 117 of the guide levers 115, the level of the wire 101 drops so that it travels well below the lower ends of the dies on its return stroke. While this action changes the length and location of the pivotal centerline of the link 111 during the return stroke, these changes are so slight that the return path of the wire 101 may also be treated as a straight line path for all practical purposes.

Vertical adjustment of the position of the wire 101 is provided for in order to compensate for slight inaccuracies or misalignment of the wire supporting frame and actuating linkage system and to insure that the wire is properly positioned with respect to the die orifices during the cutting stroke. This adjustment may readily be accomplish at the points where the wire supporting arms 102 are mounted on the links 111. As shown, each stub shaft 112 connecting an arm 102 to the adjacent link 111 is clamped tightly to the arm 102 by a bracket 126 and a pair of bolts 127 that pass through the arm and into the bracket on opposite sides of the stub shaft. The link 111 is provided with a boss 128 that surrounds the stub shaft 112, and the surrounded portion of the stub shaft is cut away on one side to form an integral key or rib 129. Two set screws 131 are threaded onto the boss 128 in opposite directions and bear against opposite sides of the rib 129. By loosening one of the set screws 131 and tightening the other, slight rotation of the stub shaft 112 and the associated arm 102 in either direction may be effected for raising or lowering the cutting wire 101 as required for aligning its path of travel with respect to the die orifices.

To insure that the wire 101 will slide under the die orifices, rather than be broken against the dies, the lower edges of the dies are preferably rounded as shown at 132.

Swinging of the actuating levers 113 and 113a through the desired angle and control of the amplitude of their angular sweep for adjusting the length of the stroke of the wire 101 may be accomplished (see Figs. 7 and 11) by means of a cam 136 and follower 137, the follower being adjustably mounted in a slot 138 cut in a boss 139 formed on the lever 113a at one side of the machine (the back side as viewed in all side elevational views of the drawings). The cam 136 is mounted on and keyed to a drive shaft 140 that extends transversely of the machine from side to side thereof and is journaled at its opposite ends in bearings 141 that are respectively carried by the side plates 142 (Figs. 2 and 11) attached to or forming a part of the machine frame. A manually operated clutch, hereinafter described, is employed for connecting the drive shaft 140 to a source of power.

In order to coordinate the feeding of dough from the dies with the movement of the cut-off wire 101, the feed-rolls 73 of the hopper 2 are preferably driven from the same drive shaft 140 through which the cam 136 is driven. For this purpose, a crank 146 is keyed to the drive shaft 140 at the near side of the machine (as viewed in all of the side elevational views of the drawings). A connecting rod 147 is pivotally connected at one end to the crank 146 and at its opposite end to an oscillating block 148 of a ratchet mechanism (Figs. 7 and 8), the block 148 being mounted to turn freely on a shaft 150 mounted adjacent its opposite ends in the frame plate 67, at the near side of the machine, and in an auxiliary frame plate 151 hung from a bracket 151a on the same frame plate 67 (see Fig. 3). The ratchet block 148 carries a spring biased pawl 152 adapted to engage a ratchet wheel 153 that is keyed to the shaft 150. Also mounted on the shaft 150 is the gear 88 that is keyed to the shaft 150 and drives the hopper feed-roll gear 86, as described above in connection with the mechanism shown in Fig. 4.

As the block 148 is oscillated by means of the crank 146 and connecting rod 147, the pawl 152 intermittently drives the feed-rolls through the ratchet wheel 153, shaft 150, gear 88, and feed-roll gear 86. In order to control the amplitude of effective driving movement of the pawl 152 for imparting rotation of the feed-rolls through a desired angle for each stroke of the cutting wire 101, an arcuately shaped shield plate 156 is mounted to cover a selected portion of the teeth of the ratchet wheel 153, the shield plate being riveted or otherwise suitably secured to one side of a gear segment 157, that turns freely on the shaft 150. The gear segment 157 meshes with a driving gear 158 keyed to a stub shaft 159, and the stub shaft is journaled adjacent its opposite ends in the frame plate 67 and in the auxiliary plate 151. The stub shaft 159 projects outwardly beyond the auxiliary plate 151 and terminates in a suitable knob 155 for manually rotating the shaft 159. To lock the shaft 159 against accidental rotation, a sprocket 160 is fixed on the shaft 159 and is engaged by a spring loaded detent 160a mounted in a bracket 160b carried by the auxiliary frame plate 151.

When the knob 155 is manually turned to rotate the stub shaft 159, the gear 158 drives the gear segment 157 meshing therewith, which in turn rotates the shield plate 156 to a desired position for limiting the effective movement of the pawl 152. As shown in Fig. 7, the pawl 152 is separated from the teeth of the ratchet wheel 153 by the shield plate 156 until the pawl has been moved through a substantial angle in a counter-clockwise direction. When the pawl slides off the edge of the shield plate 156, it engages a tooth of the ratchet wheel 153 and drives the ratchet wheel during the remainder of the angular travel of the pawl. The timing of this ratchet drive mechanism is determined by the angular relationship between the crank 146 and the cam 136 which turn together with the main drive shaft 140; and the amount of dough extruded through the dies before the cutting wire 101 begins to cut, may be increased by rotating the shield plate 156 in a clockwise direction and decreased by rotating the shield in a counter-clockwise direction in the manner described above.

When the hopper 2 is first filled with dough at the beginning of a run, all of the dough is above the feed-rolls. Before dough can be uniformly extruded from the die openings, therefore, the feed-rolls must be rotated to substantially fill the dies and the outlet passage in the lower part of the hopper between the rolls and the die orifices. Unless this lower part of the hopper is substantially filled with dough before the machine is placed in normal operation, the dough pressure at the die orifices will not be constant during extrusion, and a large number of imperfectly shaped cookies will result before uniform feeding conditions are achieved.

It is desirable, therefore, that provision be made for rotating the feed-rolls by hand to fill the space between the feed-rolls and the die orifices before starting normal operation of the machine. Manual rotation of the feed-rolls is readily accomplished by providing a square end 154, or suitable socket, on the main shaft 150 of the ratchet drive mechanism to receive a hand crank (not shown). Rotation of the shaft 150 in a counter-clockwise direction (as viewed in Fig. 7) by means of a hand crank will drive the feed-rolls directly through the gear 88 until the lower part of the hopper and the dies are filled with dough. During this operation, any suitable board or plate (not shown) may be clamped or otherwise held against the lower ends of the dies to close the die orifices until the lower part of the hopper and the dies are completely filled with dough and all air pockets therein are forced out.

The drive shaft 140, to which the cam 136 and crank 146 are keyed, may be driven by a clutch controlled mechanism including a sprocket 161 that is, in turn, driven through a chain 162 by a sprocket 163 on the output shaft 164 of a suitable speed reducing mechanism 165. The driven sprocket 161 is mounted to turn freely on the shaft 140 and is provided with a hub 166 of large diameter (Figs. 3, 14, and 15). The driven sprocket is disposed between the cam 136 and the adjacent frame side plate 67. Outwardly from the cam 136, a disc 167 of a positive clutch mechanism is freely mounted on the end of the drive shaft 140 and is provided near its periphery with an axially extending pin 168 that projects at all times into an aperture 169 in the cam 136. The pin 168 is of such a length that it may be projected completely through the cam 136 and into an aperture 171 in the driven sprocket 161, thereby locking the cam 136 and clutch disc 167 to rotate with the driven sprocket 161 and in turn rotate the drive shaft 140.

When the clutch plate 167 is slid outwardly on the drive shaft 140 to withdraw the pin 168 from the aperture 171 in the sprocket 161, the sprocket runs freely on the drive shaft, and both the mechanism for moving the cutting wire and the mechanism for turning the feed-rolls of the hopper 2 are inoperative. When the clutch plate 167 is moved inwardly, the pin 168 first bears against the side of the hub 166 until rotation of the sprocket 161 brings the aperture 171 into alignment with the pin. At this point, the pin 168 slips into the aperture 171 and effects the above described driving engagement between the sprocket 161 and the cam 136. To facilitate sliding of the pin 168 into the aperture 171 while the sprocket is rotating, the aperture 171 may take the form of an arcuate slot of considerable length.

Sliding movement of the clutch plate 167 on the drive shaft 140 is effected by means of a lever mechanism comprising a pair of arcuate blocks 172 disposed at diametrically opposite points in a groove 173 in the periphery of the clutch plate. The blocks 172 slide in the groove 173 and are pivotally connected to a lever 174 by means of a yoke 175 on the lever, and the lever is mounted for pivotal movement about a stationary fulcrum pin 176 carried by a bracket 177 mounted in any convenient manner (not shown) on an adjacent portion of the machine frame. The lever 174 is actuated by a rod 178 that is pivotally connected to the opposite end of the lever from the clutch by means of a pin 179 embraced in slots 181 in both legs (only one being shown) of a yoke 182 on the lever 174. The rod 178 extends transversely through the machine to the near side thereof where it terminates in any suitable form of knob or handle 183 adapted to be pushed and pulled by hand. Retention of the clutch in its engaged and disengaged positions may be effected by a spring biased detent 184 mounted on the side panel 24 of the machine and a pair of notches 186 and 187 in the rod 178 for receiving the detent 184 when the clutch is in its engaged and disengaged positions respectively.

Referring again to Fig. 1, the conveyor 7 carrying the series of trays 8 preferably consists of a pair of endless chains 191 that carry the trays. The chains are disposed at opposite sides of the machine with the trays extending therebetween, and the chains run over and are supported and guided by oppositely disposed pairs of sprockets appropriately located along the conveyor path. The series of sprockets for each of these chains may include a main drive sprocket 192 mounted on a transversely extending drive shaft 193, and a series of idler sprockets, such as 194 to 214, inclusive.

The idler sprockets 201 to 207, inclusive, within the oven 4 are mounted on stub shafts carried by the frame of the oven and are disposed in any desired arrangement to provide a path of travel of the maximum practical length within the oven and thereby keep the oven size to a minimum. When a longer oven is employed, for the purpose of increasing the path of travel therethrough and thereby increasing the capacity of the machine in the manner described above, the number of idler sprockets mounted within the oven may remain the same; but in the event a higher oven should be employed for this purpose, additional idler sprockets within the oven may be required to provide additional reversals of the direction of travel of the conveyor. While the path of travel of the conveyor within the oven, as shown in the drawings, consists principally of a series of horizontal paths or reaches, this arrangement may be varied, if desired, for any particular oven design.

The drive shaft 193 for the conveyor chains is journaled in bearings 216 respectively mounted on the longitudinally extending base channels 18. The shaft is driven by a sprocket 217 which is most conveniently mounted on the drive shaft at the back side of the machine in a position to be driven through a chain 218 by a second sprocket 219 on the output shaft 164 of the speed reducer 165. In the embodiment of the invention illustrated herein, the upper flange of the base channel 18 is cut away at 221 to provide clearance for the sprocket 217.

Inasmuch as the conveyor is driven by the single pair of drive sprockets 192 on the drive shaft 193, the conveyor chains are under tension throughout substantially their entire length from the hopper 2 through the oven to the take-off mechanism at the opposite end of the machine. As a result, there is little tendency for any slack to develop in the chains along this portion of the conveyor path, and the chains run smoothly with a minimum tendency to jar the trays and dislodge cookies carried thereby.

Along horizontal reaches of the conveyor path between various pairs of idler sprockets, and between the last idler sprocket 214 and the drive sprocket 192 on each side of the machine, suitable tracks are provided for supporting the chains. These tracks are supported at convenient points on the frame of the machine as illustrated, for example, by the tracks 222 and supporting brackets 223 mounted at opposite sides of the machine on the base channel members 18 and extending between the idler sprockets 214 and the drive sprockets 192 (Figs. 1 and 3).

The pans carried by the conveyor preferably comprise shallow, inverted channels 226 closed at their ends by bars 227 (Fig. 13), that may be welded to the channels. Oppositely directed supporting pins 228 are mounted in the bars 227 to project outwardly through the conveyor chains and serve both as pivotal supports for the trays and as connecting pins in the chains. To assist in holding the trays in horizontal positions at all times during their travel, a weight in the form of a bar 231 is suspended below each tray by a pair of brackets 232 that may be welded to the under side of the tray and welded or bolted to the bar 231. To assist in holding cookies on the trays in the event the trays are jarred or tilted slightly during their travel, the trays may be provided with spaced indentations 233 along the longitudinal centerlines of the trays at the centers where individual cookies are spotted as they drop from the several dies, as indicated in Fig. 16. In place of the indentations 233, holes 234 through the trays may be employed to perform the same function, as illustrated in Fig. 13.

As shown in Fig. 1, the conveyor 7, after passing under the dies of the hopper 2, passes partially around idler sprockets 196 that rotate on fixed stub shafts 236. The conveyor then passes partially around idler sprockets 197 that rotate on movable stub shafts 237. The fixed shafts 236 are suitably journaled in the frame side plates 142, and a pair of bell cranks 238 (only one being shown) are respectively mounted thereon at opposite sides of the machine. Arms of the bell cranks 238 that extend generally horizontally from the fixed shaft 236 have a suitable weight 239 supported between their free ends. Arms of the bell cranks 238 that extend generally vertically from the fixed stub shafts 236 carry movable stub shafts 237. With this arrangement, the weight 239 urges the bell cranks and associated sprockets 197 in a counter-clockwise direction about the fixed shafts 236 for maintaining a degree of tension in the conveyor chains that may be readily adjusted by adding to, or subtracting from, the weight 239.

The idler sprockets 198, 199, and 200 turn on fixed stub shafts suitably mounted in the frame of the machine for guiding the conveyor horizontally under an inclined mirror 230 and then downwardly and into one end of the oven adjacent the bottom thereof. Where the conveyor emerges from the bottom of the opposite end of the oven, the conveyor chains pass partially around sprockets 209 and extend upwardly therefrom through a cookie cooling zone 240 to a mechanism for removing the cookies from the trays and depositing them upon an auxiliary conveyor, generally designated 241 in Fig. 1. The cooling zone 240 between the oven 4 and the auxiliary conveyor 241 is preferably provided with side and top panels of screening or grillwork as mentioned above, and a fan 242 is mounted in the cooling zone on any suitable support 243 which may be secured to the frame of the machine in any desired manner.

The fan 242 provides an upwardly moving current of air that is exhausted through the grillwork panel 30 at the top of the cooling zone. To obtain the maximum benefit from this current of air for cooling the cookies on the trays as they are moved upwardly toward the cookie take-off mechanism, the idler sprockets 210 and 211 are suitably disposed for guiding the conveyor directly over the fan 242 and thence upwardly to idler sprockets 212 at the top of the machine.

From the idler sprockets 212 the conveyor travels downwardly at an angle under the take-off mechanism, then partially around idler sprockets 213 and 214 and back along the length of the machine to the main drive sprockets 192.

As shown in Figs. 17 to 19, the take-off mechanism includes a tray-tilting wire or bar 246 that serves as a cam sliding over the leading edges of the trays for giving them an initial tilt as they pass around the axis of the idler sprockets 212. While in their initially tilted positions, the trays, at their leading edges, contact guide brackets 247 that are mounted at opposite sides of the machine and bear against the trays at their opposite ends to continue their tilting movement until their surfaces are parallel to the sloping path of travel of the conveyor in this region.

As the leading edges of the trays pass the lower ends of the guide brackets 247 they slide under a thin edged knife blade 248 having a large scale, saw-tooth, upper edge configuration, as shown in Fig. 17. In order to hold the surfaces of the trays firmly against the knife blade 248 so that the saw-tooth edge of the blade will remain in contact with the tray surfaces as they pass thereunder, yieldably mounted, preferably non-metallic, guide blocks 251 (only one being shown) are mounted at each side of the machine for engaging the bottoms of the ends of the trays while the tops of the trays are still engaged by the guide brackets 247 and until the trays have passed under the knife blade 248. As shown in Figs. 18 and 19, the guide blocks 251 are disposed directly under the end bars 227 of the trays and are urged upwardly against these bars by springs 252. The springs 252 are seated on brackets 253 secured to the adjacent side of the machine frame, and the guide plates are provided with rigidly attached pins 254 that extend downwardly through the springs 252 and loosely through apertures 256 in the brackets 253.

As best shown in Fig. 17, the saw-tooth configuration of the knife blade 248 is so proportioned that the apexes of the teeth are spaced apart a distance twice that between the centers of the cookies on the trays. As the trays travel downwardly under the knife blade, each cookie is engaged by a sharp side edge of a tooth of the knife blade. Because the blade hugs the tray surface, it slides under the cookies and tends to rotate them slightly about their axes normal to the trays, as well as to pry them upwardly off of the trays. This action has been found to be highly effective in removing the cookies from the trays with a minimum of cookie breakage.

When the cookies are thus freed from the trays, they slide downwardly over the knife blade 248 and down a chute formed by a number of closely spaced, curved wires 257 that permit free circulation of air from the fan 242 for additional cooling. The upper ends of the wires may be secured to the lower edge of the knife blade 248, as by welding, and adjacent their lower ends, they may be supported on a transversely extending member 258 that is fastened at its opposite ends in any suitable manner to the frame of the machine.

Cookies sliding off the lower end of the chute are deposited upon the auxiliary conveyor 241, which may suitably comprise an open mesh screen 261 forming an endless belt. Below the lower end of the chute, the screen 261 may turn around a driving roller 262 mounted on and turning with a shaft 263. The shaft 263 may be journaled at its opposite ends in any suitable frame structure, such as frame plates 264 extending outwardly from the frame of the machine adjacent the take-off mechanism. At one end, the shaft 263 may extend beyond the frame plate 264 and carry a sprocket 266 adapted to be driven by a chain 267 from an aligned sprocket 268, which may be mounted on an extension of a through-shaft 269 for the main conveyor idler sprockets 213. The idler sprockets 213 and the driving sprocket 268 for the auxiliary conveyor are mounted on the shaft 269 to turn therewith, whereby the auxiliary conveyor may be driven at a speed determined by the relative sizes of the sprockets 266 and 268 and preferably somewhat slower than the speed of the tray conveyor to space rows of cookies closely thereon and provide more time for additional cooling.

The auxiliary conveyor 241 may extend any desired distance to a suitable point for removing the cookies therefrom, either by hand or by any suitable collecting mechanism (not shown). An operator standing at this point may look into the mirror 230 and see that cookies are being properly formed and spotted on the trays. The purpose of making the conveyor belt 261 of open mesh, screen material is to facilitate the passage of air therethrough for additional cooling of the cookies. If desired, a fan (not shown) may also be located below the auxiliary conveyor for blowing a stream of air upwardly therethrough.

When the trays have traveled from the take-off mechanism back to the main drive sprockets 192 and begin their upward travel toward the hopper 2, they are engaged by a centrally disposed, curved bar 271 that may be mounted in any suitable manner (not shown) and acts as a cam to tilt the trays into alignment with their upward path of travel. While in this position the trays may pass by the rotating brush 6 adapted to clean the trays of any adherent cookie crumbs before they again pass under the hopper 2. The brush 6 may be mounted to turn with its shaft 273, and the shaft 273 may carry a pulley 274 at one end thereof adapted to be driven by a belt 276 passing around a drive pulley 277 associated with the power supplying mechanism hereinafter described. Depending upon the severity of the tray cleaning problem, the brush 6 may be provided with either stiff wire bristles 272 or with softer natural or synthetic bristles.

While the trays are passing by the brush 6, the ends thereof are engaged at their back sides by a pair of narrow guide plates 278 (only one being shown) for holding the trays against the brush. These plates may be disposed to engage the edges of the bars 227 at the ends of the trays, and they may be mounted on the frame of the machine in any suitable manner (not shown).

For proper spotting of the cookies on the trays as they pass under the hopper dies, it has been found necessary to provide for vertical adjustment of the path of travel of the trays under the dies. The distance between the die orifices and the top surfaces of the trays is preferably adjusted as indicated in Fig. 16 so that the leading edges of the cookies being cut drop down and touch the trays just as the cutting wire completes its cut. As the leading edges of the cookies touch the trays, they tend to stick thereto and cause the cookies to be uniformly aligned on the trays as they fall. This prevents throwing of the cookies by the cutting wire. In Fig. 16 a tray is shown in solid outline at the proper elevation to receive a small diameter cookie from a small die also shown in solid outline. In phantom outline, the tray is shown at a lower level for receiving a larger diameter cookie from a larger die. It will be observed that, in both instances, the leading edges of the cookies are in contact with the tray as the cutting stroke of the wire is completed.

In the event all of the die orifices used at one time are of the same size and shape, they will of course be positioned exactly in alignment along the length of the hopper 2. If die orifices of different sizes or shapes are used at the same time, the orifice edges furthest from the cut-off mechanism should be aligned so that the cut-off wire 101 completes its cut of dough from all dies simultaneously, the height of the trays being adjusted for the dies having the shortest openings lengthwise of the path of the cutting wire.

In addition to providing for vertical adjustment of the path of travel of the trays under the hopper dies, the positions of the trays along this path must also be adjustable with changes in the cutting stroke to insure that the trays will be directly under the dies when the cookies drop therefrom. To provide for the required horizontal, as well as vertical, adjustment of the tray positions with respect to the hopper dies the idler sprockets 194 are mounted in fixed positions on stub shafts 281 for maintaining a fixed path of travel of the trays adjacent the brush 6; and the idler sprockets 195 are mounted on stub shafts 282 that are in turn mounted on a suitable frame for adjusting the positions of the sprockets both horizontally and vertically.

As best shown in Figs. 7 and 13, the stub shafts 282 for the adjustable idler sprockets 195 are respectively mounted in the free ends of a pair of levers 284. The levers 284 are disposed outwardly of the idler sprockets 195 and are rigidly mounted at their opposite ends on a sleeve 285 surrounding a pivot shaft 283 for rotation thereon. An actuating arm 286, which may be cast integrally with one of the levers 284, is provided for rocking both of the levers and their connecting sleeve 285 as a unit about the pivot shaft 283.

Movement of the actuating arm 286 may be accomplished by means of a hand crank (not shown) adapted to be applied to a shaft 287 mounted on the frame of the machine in a fixed, suitably supported bearing 288 so as to restrain the shaft 287 against axial movement with respect to the bearing and the frame of the machine. The shaft 287 extends through the bearing 288 and threadedly engages a block 289 connected to the end of the actuating arm 286 by means of a link 291. Rotation of the shaft 287 in one direction causes the block 289 to travel along the shaft and swings the actuating arm 286 in one direction. Reverse rotation of the shaft 287 swings the actuating arm 286 in the opposite direction. This movement of the actuating arm 286 is transmitted to the levers 284 for imparting similar movement to the sprocket stub shafts 282 thus changing the horizontal location of the beginning of the generally horizontal reach of the conveyor that extends forwardly under the hopper 2.

As viewed in Fig. 7, clockwise movement of the shafts 282 about the pivot shaft 283 results in movement of the trays under the hopper in a backward direction along their path of travel, and counter-clockwise movement of the shafts 282 results in movement of the trays in a forward direction along their path of travel. Such forward or rearward movement of the horizontal reach of the conveyor below the hopper 2 is compensated by rocking of the bell cranks 238 of the chain tension regulating device, described above, without materially altering the chain tension or causing any overall travel of the conveyor as a whole.

Vertical adjustment of the position of the pivot shaft 283 is permitted by the link 291 without substantially altering the positions of the sprocket stub shafts 282 with respect to the pivot shaft 283. Such vertical adjustment of the position of the pivot shaft 283 may be accomplished by mounting this shaft rigidly at its opposite ends in a pair of vertically disposed arms 292, each of which has a rack 293 formed on the lower end thereof. The arms 292 are slidably mounted in vertical guide members 294 carried by brackets 296 secured to the frame side plates 67 as shown in Fig. 3. The guide members 294 are provided with bosses 295 in which the stub shafts 281 for the idler sprockets 194 are mounted.

A pinion shaft 297 extends transversely of the machine between bearings 298 also carried by the brackets 296, and a pair of pinions 299 are mounted on and keyed to the pinion shaft 297 for engagement with the racks 293 respectively. At the left hand side of the machine, as viewed in Fig. 13, the pinion shaft 297 extends outwardly through the side panel 24 and terminates in a hand crank 300 provided with a suitable spring-loaded pin 301, or the like, adapted to enter any selected one of an arcuate array of holes in a fixed plate 305 for holding the crank in a selected position in a well known manner. Adjustment of the position of the hand crank 300 effects rotation of the pinion shaft 297 and the pinions 299 thereon. By adjusting the position of the hand crank 300, the arms 292 may be moved upwardly and downwardly as required to adjust the vertical position of the pivot shaft 283 and the entire lever structure upon which the idler sprockets 195 are mounted. This results in vertical adjustment of one end of the generally horizontal reach of the conveyor extending under the hopper.

While vertical adjustment of the position of the pivot shaft 283 causes slight angular movement of the link 291 about its pivot points, and thus alters the adjustment of the horizontal positions of the trays to a small degree, and while rotation of the actuating shaft 287 to rock the associated lever mechanism also affects the vertical adjustment of the path of travel of the trays to a small degree, it will be apparent that both the horizontal and vertical adjustment may be accomplished by appropriate manipulation of both the actuating shaft 287 and the pinion shaft 297. By these two adjustments, the positions of the trays may be accurately set with respect to the hopper dies for uniform spotting of the cookies on the trays in the manner described and illustrated in Fig. 16.

The driving of the various parts of the machine during its normal operation is preferably accomplished by suitable power take-offs from a single motor 302. Referring principally to Figs. 2 and 3, this motor may be mounted on a base 303 pivotally supported at one end by a pin 304 carried in the upper ends of a pair of arms 306. The arms 306 are in turn mounted at their lower ends on a sleeve 307 to which they may be welded or otherwise rigidly secured. A second support for the motor base 303 may be mounted on the sleeve 307 and may consist of an elongated boss 308 having a bolt 309 threaded longitudinally therein and extending upwardly with its head engaging the underside of the motor base 303. The bolt 309 may carry a lock nut 311 whereby the bolt may be securely locked for holding the motor base in a desired angular position with respect to the pivot pin 304.

The sleeve 307, by which the motor base is supported, as described above, is rotatably mounted adjacent its opposite ends in brackets 312 and 313 supported in any suitable manner on the base of the machine. Rotation of the sleeve 307 in its supporting brackets 312 and 313 for adjusting the motor position about the axis of the sleeve, may be controlled by means of a radially extending lever 314 that projects upwardly and carries a threaded nut 316 pivotally mounted on the lever 314 for receiving a threaded control shaft 317. The shaft 317 is threaded at one end into the nut 316 and projects to the right, as viewed in Fig. 2, terminating beyond the end of the machine in a portion 315 shaped for engagement by a hand crank (not shown). The control shaft 317 is pivotally mounted in a suitable bracket 318 carried by the frame of the machine for restraining the shaft against longitudinal movement while permitting it to turn about its own axis and oscillate within limits about a horizontal axis normal thereto. For simplicity, the details of this mounting are omitted. When the control shaft 317 is rotated, the nut 316 travels therealong for rotating the control lever 314 and thereby controlling the angular position of the motor with respect to the axis of the supporting sleeve 307.

The motor shaft 319 carries a conventional pulley 321 and a variable diameter pulley 322 for respectively supplying power to the brush 6 and the speed reducing mechanism 165. A flat belt 323 may be employed to connect the conventional pulley 321 to a conventional driven pulley 326, and a V-belt is employed to connect the variable pulley 322 to a pulley 327 on an input shaft 331 of the speed reducing mechanism.

The conventional driven pulley 326 is mounted on one end of an idler shaft 328 that is in turn mounted for rotation within the motor supporting sleeve 307. At its opposite end the idler shaft 328 projects outwardly beyond the sleeve 307 and carries the pulley 277, referred to above, for driving the brush 6 through the connecting belt 276.

As best viewed in Fig. 2, rotation of the motor 302 about the sleeve 307 serves to adjust the distance between the motor shaft 319 and the input shaft 331 of the speed reducer. This changes the tension in the V-belt 324, by which the effective diameter of the variable pulley 322 is regulated, and thereby changes the speed of the input shaft 331 of the speed reducer. In this manner, the speeds of the conveyor, the cut-off mechanism, and the hopper feed-rolls are readily controlled without affecting the distance between the motor shaft 319 and the idler shaft 328. This latter distance may be adjusted to maintain proper tension in the flat belt 323, without materially affecting the above described speed control, by rotating the motor supporting bolt 309 in the boss 308 to rock the motor about the pivot pin 304.

When placing the machine of this invention in operation, the burners 11 in the oven 4 are first turned on to bring the oven up to the desired temperature. While the oven is heating the hopper 2 may be filled with a previously prepared dough. Different, previously prepared doughs may be placed in the separate hopper compartments 45, 46, and 47, if desired. With the die orifices temporarily closed, as described above, a hand crank is then applied to the crank-receiving end 154 of the shaft 150 associated with the ratchet drive for the hopper feed-rolls, and the crank is turned in a counter-clockwise direction, as viewed in the drawings, for rotating the hopper feed-rolls until dough from the hopper compartments has been fed downwardly to fill the hopper outlet passage and the dies associated therewith.

The motor 302 may then be turned on for driving the conveyor 7 with the tension in the V-belt 324 set to provide the desired ratio between the speed of the motor shaft 319 and the speed of the input shaft 331 to the speed reducing mechanism 165. When the motor 302 is started, the clutch control knob 183 should be in its withdrawn position shown in Fig. 14 so that the clutch for the drive shaft 140 is disengaged and the cut-off mechanism and ratchet drive for the feed-rolls are inoperative.

Before engaging the clutch for the drive shaft 140, the hand crank 300 should be adjusted to rotate the pinion shaft 297 for adjusting the vertical spacing between the hopper dies and the trays as required by the dimensions of the die orifices.

Upon pushing the clutch control knob 183 inwardly to engage the clutch associated with the drive shaft 140, the ratchet mechanism for driving the feed-rolls and the cam-actuated cut-off mechanism are started in operation. A hand crank should be applied at once to the actuating shaft 287 for rocking the levers 284 to coordinate the horizontal travel of the conveyor trays under the dies with the operation of the cut-off mechanism for centering the cookies on the longitudinal center lines of the trays. At the same time, further adjustment of the pinion shaft 297 may be required for more accurate adjustment of the spacing between the dies and the trays therebelow. Any required adjustment of the rate of feed from the hopper may be effected by altering the position of the arcuate shield plate 156 in the ratchet drive for the feed-rolls, as described above.

In this manner the movement and position of the trays below the dies may be quickly adjusted so that the cookies droping from the dies will be accurately spotted on the trays, as described, with reference to Fig. 16. As a result of the adjustments of the path of travel and movement of the trays under the dies, and as a result of the pre-filling of the dies with dough by manual rotation of the shaft 159, clean cutting of perfectly formed cookies and proper spotting of the cookies on the trays are obtained in a minimum of time and with a minimum waste of dough during the adjustment period. The thickness of the cookies may also be readily varied at will by turning the knob 155 to adjust the ratchet mechanism by which the extrusion thickness is controlled.

The cookies deposited on the trays are carried thereby successively around the idler sprockets 196, 197, 198, 199, and 200 toward the opening 41 leading into the oven 4 adjacent the bottom thereof. From this point the trays travel upwardly within the oven and around the idler sprockets 201 where they begin their series of horizontally traveling movements through the oven. As the trays pass around the first idler sprockets 201 in the oven, they pass under the flash heaters 13 where they may be subjected to a brief period of intense heating for initially setting a skin on the dough to prevent further lateral spreading thereof and obtain other desired baking effects. After passing around the idler sprockets 202 to 206, inclusive, the trays pass under a second set of flash heaters 14 for again subjecting the cookies to a brief period of intense heating to brown the upper surfaces thereof. This completes the baking of the cookies, and the trays then pass around the idler sprockets 207 and 208 to the oven exit opening 42 and thence around the idler sprockets 209 for upward movement through the cooling zone 240.

During travel of the trays through the cooling zone 240, a blast of air is directed against the undersides of the trays by the fan 242 for cooling the trays and the cookies carried thereby before the trays reach the take-off mechanism 5.

Upon passing around the idler sprockets 212 at the top of the cooling zone, the trays are contacted by the tilting bar 246 for giving the trays an initial tilt and guiding them under the side guides 247. The side guides 247 complete the tilting of the trays into the plane of the knife blade 248 so that the knife blade will slide over the tray surfaces for removing the cookies. The yieldably mounted guide blocks 251 assist in holding the trays firmly against the knife blade 248 to insure that the knife blade slides under the cookies and pries them away from the tray surfaces rather than contacting the cookies edgewise and pushing them along the tray surfaces. This action is also facilitated by the holes or depressions in the trays which embrace knobs on the bottoms of the cookies and thereby hold them somewhat against sliding as the knife blade contacts them.

As the cookies are freed from the trays, they slide down the chute wires 257 and are deposited upon the endless conveyor screen 261 for travel to a convenient point for manual or automatic removal. During travel of the cookies along the screen conveyor 261 additional cooling of the cookies is obtained by reason of the open mesh structure of this conveyor which permits air to move freely therethrough. As noted above, an additional fan may be employed, if desired, to increase this air movement.

After the cookies have been removed, the trays pass around the idler sprockets 213 and 214 in the course of traveling downwardly to the base of the machine. Between the idler sprockets 214 at one end of the machine, and the drive sprockets 192 at the opposite end of the machine, the long horizontal reach of the conveyor is supported by the tracks 222.

As the trays pass around the drive sprockets 192, they are engaged by the tilting bar 271 and then by the guide plates 278 for tilting and holding the trays in alignment with their generally upward path of travel past the rotating brush 6, which scours the tray surfaces free from adherent crumbs to prepare them for again receiving dough from the hopper dies. Upon passing beyond the guide plates 278, the trays are permitted to return to their normal horizontally disposed positions, which they maintain until they again reach the take-off mechanism at the opposite end of the machine.

As will be apparent from the foregoing description of the invention, several important improvements in machines of this character have been achieved. The general arrangement of the principal parts of the machine on the unitary base permits the manufacturer of the machine to vary its capacity merely by providing a longer base and a longer oven section between the hopper and take-off ends of the machine.

The invention also makes it possible for the operator of the machine to disassemble the hopper completely for cleaning, or merely to remove the dies therefrom for changing cookie shapes, with ease and rapidity. The hopper may be completely disassembled and the feed-rolls removed, and the dies may be individually or collectively removed from the machine, entirely from the hopper end thereof, without disassembling any of the mechanism by which the hopper feed-rolls are driven and without requiring the removal of any of the panels of the machine housing other than the end panel adjacent the hopper. This invention also provides a hopper construction which makes it possible for different types of dough or batter to be handled in adjacent compartments of the hopper for producing different types of cookies simultaneously.

The invention also provides mechanism by which substantially perfectly formed cookies may be produced after but a few initial strokes of the cut-off wire and by which the cookies may be uniformly and accurately spotted on the trays.

The invention also provides an improved tray construction and cookie take-off mechanism whereby cookies may be conveyed through the oven and thereafter removed from the machine with a minimum of spilling of cookies from the trays and breakage of cookies during their removal.

These and numerous other improvements embodied in the general design and mode of operation of the machine of the present invention contribute to the accomplishment, with a high degree of perfection, of all of the various objects set forth in the introductory portion of this specification.

While the invention has been described with reference to a specific embodiment shown in drawings for illustrative purposes, it will be apparent that many novel principles of operation are involved and that many variations in the mechanism for carrying out these principles are possible without departing from the scope of the invention as defined in the appended claims.

This application is a division of copending application Serial No. 160,501, for Cookie Machines, filed by me and Paul C. Bauer as joint inventors May 6, 1950, now Patent No. 2,667,130, dated January 26, 1954. The subject matter claimed in said copending application consists of the mechanism for supporting and moving the cut-off wire 101 along a desired closed path in relation to the die openings of the dough hopper 2.

Having described the invention and its mode of operation, in detail, I claim:

1. In a machine of the class described, a horizontally elongated base for said machine; a first self-sustaining frame structure mounted on said base at one end thereof and carrying a hopper and associated die for extruding material, means for cutting said material into slabs as it is extruded, and means for supporting and guiding a portion of an endless conveyor extending along a first path under said die for travel toward the opposite end of said base; a second self-sustaining frame structure mounted on said base at the end thereof opposite said first frame structure in horizontal alignment therewith and carrying means for supporting and guiding a portion of said endless conveyor extending along a second path passing into the second frame structure and turning back toward the first frame structure, and means for removing from the conveyor slabs of extruded material carried thereon; a third frame structure mounted on said base between said first and second frame structures, means substantially enclosing the top and sides of said third frame structure to define an oven zone therein, means for supplying heat to said oven zone, and means mounted in said third frame structure for supporting and guiding a portion of said endless conveyor extending along a third path connecting said first and second paths and traveling through said oven zone toward said second frame structure; means mounted on said base for supporting and guiding a portion of said endless conveyor extending along a fourth path connecting said first and second paths and traveling below said first, second, and third paths from said second frame structure back to said first frame structure; power means mounted on said base for driving said endless conveyor continuously along said paths; and means associated with said power means for adjusting the speed of the conveyor as required by the length of said third path through said oven zone and by the rate of supply of heat thereto.

2. In a machine of the class described, a horizontally elongated base for said machine; a first self-sustaining frame structure mounted on said base at one end thereof and carrying a hopper and associated die for extruding material, means for cutting said material into slabs as it is extruded, and means for supporting and guiding a portion of an endless conveyor extending along a first path under said die for travel toward the opposite end of said base; a second self-sustaining frame structure mounted on said base at the end thereof opposite said first frame structure in horizontal alignment therewith and carrying means for supporting and guiding a portion of said endless conveyor extending along a second path passing into the second frame structure and turning back toward the first frame structure, and means for removing from the conveyor slabs of extruded material carried thereon; a third frame structure mounted on said base between and connected to said first and second frame structures, means substantially enclosing the top and sides of said third frame structure to define an oven zone therein, means for supplying heat to said oven zone, and means mounted in said third frame structure for supporting and guiding a portion of said endless conveyor extending along a third path connecting said first and second paths and traveling through said oven zone along a tortuous route toward said second frame structure; means mounted on said base for supporting and guiding a portion of said endless conveyor extending along a fourth path connecting said first and second paths and traveling below said first, second, and third paths from said second frame structure back to said first frame structure; power means mounted on said base for driving said endless conveyor continuously along said paths; and means associated with said power means for adjusting the speed of the conveyor as required by the length of said third path through said oven zone and by the rate of supply of heat thereto.

3. In a machine of the class described, a horizontally elongated base for said machine; a first self-sustaining frame structure mounted on said base at one end thereof and carrying a hopper and associated die for extruding material, cutting means actuatable for cutting said material into slabs as it is extruded, and means for supporting and guiding a portion of an endless conveyor extending along a first path under said die for travel toward the opposite end of said base; a second self-sustaining frame structure mounted on said base at the end thereof opposite said first frame structure in horizontal alignment therewith and carrying means for supporting and guiding a portion of said endless conveyor extending along a second path passing into the second frame structure and turning back toward the first frame structure, and means for removing from the conveyor slabs of extruded material carried thereon; a third frame structure mounted on said base between and adjoining said first and second frame structures, means substantially enclosing the top and sides of said third frame structure to define an oven zone therein, means for supplying heat to said oven zone, and means mounted in said third frame structure for supporting and guiding a portion of said endless conveyor extending along a third path connecting said first and second paths and traveling through said oven zone along a tortuous route toward said second frame structure; means mounted on said base for supporting and guiding a portion of said endless conveyor extending along a fourth path connecting said first and second paths and traveling below said first, second, and third paths from said second frame structure back to said first frame structure; power means mounted in said first frame structure for driving said conveyor and actuating said cutting means in timed relation to the speed of the conveyor; and means associated with said power means for adjusting the speed of the conveyor as required by the length of said third path through said oven zone and by the rate of supply of heat thereto.

4. In a machine of the class described, a horizontally elongated base for said machine; an endless conveyor traveling along a tortuous closed path reaching substantially from end to end of said base; a first self-sustaining frame structure mounted on said base at one end thereof and carrying a hopper and associated die for extruding material, cutting means actuatable for cutting said material into slabs as it is extruded, and means for supporting and guiding a portion of said endless conveyor extending along a first path section under said die for travel toward the opposite end of said base; a second self-sustaining frame structure mounted on said base at the end thereof opposite said first frame structure in horizontal alignment therewith and carrying means for supporting and guiding a portion of said endless conveyor extending along a second path section passing into the second frame structure and turning back toward the first frame structure, and means for removing from the conveyor slabs of extruded material carried thereon; a third self-sustaining frame structure mounted on said base between and adjoining said first and second frame structures, means substantially enclosing the top and sides of said third frame structure to define an oven zone therein, means for supplying heat to said oven zone, and means mounted in said third frame structure for supporting and guiding a portion of said endless conveyor extending along a third path section connecting said first and second path sections and traveling through said oven zone along a tortuous route toward said second frame structure; means for supporting and guiding a portion of said endless conveyor extending along a fourth path section connecting said first and second path sections and traveling from said second frame structure back to said first frame structure below said oven zone; power means mounted within said first frame structure for driving said conveyor and for actuating said cutting means in timed relation to the speed of the conveyor from a common drive shaft, and means associated with said power means for adjusting the speed of said common drive shaft to simultaneously adjust the speed of the conveyor and of the cutting means as required by the length of said third path through said oven zone and by the rate of supply of heat thereto.

5. A hopper and feed-roll assembly comprising separable upper and lower housing sections and manually releasable means for clamping the sections together, said upper housing section defining a material holding chamber and substantially the upper half of a feed-roll chamber, said chambers communicating by way of a longitudinally extending opening of less width than the feed-roll chamber, said lower housing section defining substantially the lower half of said feed-roll chamber and a downwardly opening outlet passage therebelow, a pair of feed-rolls disposed in said feed-roll chamber and extending axially substantially the full length thereof, each of said rolls having axial shafts extending therebeyond in both directions, bearings for the axial shafts at one end of said rolls being carried at least in part by one of said housing sections, and separable bearings for the axial shafts at the other end of said rolls, each of said separable bearings being half in the upper housing section and half in the lower housing section, at least one pair of upper and lower manually removable partitions disposed in abutting vertical alignment and extending transversely across the interiors of said upper and lower housing sections, respectively, for dividing them into compartments, said partitions being shaped to fit at least partially around said rolls, and said rolls being circumferentially grooved to receive the adjacent edge portions of said partitions.

6. A hopper and feed-roll assembly comprising an upper housing section, a separable lower housing section, and manually releasable means for clamping said upper and lower housing sections together, said upper housing section defining a material holding chamber having downwardly converging side walls and also defining substantially the upper half of a feed-roll chamber therebelow, an opening between said chambers substantially coextensive in length with said feed-roll chamber, a lower housing section defining the lower half of said feed-roll chamber and also defining an outlet passage therebelow, a pair of feed-rolls disposed in said feed-roll chamber and extending longitudinally substantially from end to end thereof, each of said rolls having axial shafts extending therebeyond in both directions through separable bearings, each bearing being half in the upper housing section and half in the lower housing section, at least one pair of upper and lower manually removable partitions disposed in abutting vertical alignment and extending transversely across the interiors of said upper and lower housing sections, respectively, for dividing them into compartments, said partitions being shaped to fit at least partially around said rolls, and said rolls being circumferentially grooved to receive the adjacent edge portions of said partitions.

7. The hopper and feed-roll assembly of claim 6 in which said feed-rolls have a generally longitudinally grooved surface for engaging material in said holding chamber and are circumferentially grooved for receiving adjacent edge portions of said partitions to a depth at least equal to the depth of the generally longitudinal grooves.

8. The hopper and feed-roll assembly of claim 6 including a separate orifice-defining extrusion die associated with the lower end of each compartment of said outlet passage, each die being mounted over the lower end of said outlet passage for separate manual removal.

9. In a machine of the class described, a hopper for receiving material, feed-rolls associated with said hopper and mounted for rotation to feed material therefrom, a die associated with said hopper for shaping material fed therefrom, said die defining an extrusion orifice, a cutting wire, means mounting said wire for movement in a direction normal to its axis and along a closed path across said orifice at regular intervals for cutting material emerging from the orifice, a shaft rotatably mounted in driving engagement with said rolls, a ratchet wheel fixed on said shaft, a spring biased pawl mounted for reciprocation for driving said ratchet wheel while moving in one direction and for sliding over the periphery of the ratchet wheel while moving in the opposite direction, means connected to said cutting wire and said pawl for driving them together in predetermined, timed relationship, and means for manually applying torque to said shaft for rotating it independently of said pawl to feed material from the hopper for filling the die while said pawl is stationary.

10. A conveyor chain positioning and guiding mechanism comprising a supporting structure, a lever mounted for pivotal movement about a first axis, a chain engaging sprocket rotatably mounted on said lever for rotation about a second axis spaced from and parallel to said first axis, means mounted on said structure for adjustably rocking said lever about said first axis, and means mounted on said structure for adjusting the position of said first axis in a direction normal thereto.

11. A conveyor chain positioning and guiding mechanism comprising a supporting structure, a pair of spaced members carried by said structure and having a shaft extending therebetween, means mounting said spaced members on said structure for adjustable movement together normal to the axis of said shaft, a pair of spaced levers mounted on said shaft for pivotal movement together thereon about said axis, said levers having chain engaging sprockets respectively mounted thereon for rotation about a common axis spaced from the axis of said shaft, and means mounted on said structure for rocking said levers about the axis of said shaft.

12. In a cookie machine comprising a supporting structure, and a conveyor including a pair of spaced, parallel chains mounted on said structure for movement along a closed path, a conveyor chain positioning and guiding mechanism comprising a pair of spaced members having a shaft extending therebetween, means supporting said spaced members on said structure for movement normal to the axis of said shaft, a pair of spaced levers mounted on said shaft for rotation about its axis, said levers having chain engaging sprockets respectively mounted thereon for rotation about a common axis spaced from the axis of said shaft, means mounted on said structure for adjustably rocking said levers about the axis of said shaft, and means mounted on said structure for adjustably moving said spaced members together normal to the axis of said shaft.

13. In a cookie machine comprising a supporting structure, and a conveyor including a pair of spaced, parallel chains mounted on said structure for movement along a closed path, a conveyor guiding and adjusting mechanism comprising a shaft mounted on said structure, a lever mounted for rotation about said shaft, a pair of sprockets rotatably mounted in coaxial alignment on said lever with their common axis spaced from the axis of said shaft, said sprockets respectively being in engagement with said chains for guiding the same and defining a portion of their path of travel, means mounted on said structure for adjustably rocking said lever about said shaft, and means for adjustably moving said shaft normal to its axis.

14. In a machine of the class described, a hopper for receiving material, feed rolls associated with said hopper and mounted for rotation to feed material therefrom, a die associated with said hopper for shaping material fed therefrom, said die defining an extrusion orifice, a cutting wire, means for mounting said wire for movement in a direction normal to its axis and along a closed path across said orifice at regular intervals for cutting material emerging from the orifice, a common drive shaft for supplying power to operate said feed rolls and said cutting wire, a direct driving connection between said drive shaft and said cutting wire, and an intermittent driving connection between said drive shaft and said feed rolls, said intermittent driving connection including an overrunning driving coupling permitting the feed rolls to overrun said drive shaft and means acting between said coupling and the feed rolls for rotating the feed rolls while said common drive shaft and cutting wire are stationary.

15. In a machine of the character described, means for feeding plastic material downwardly through an orifice, slicing means for severing and dropping slices of said material at uniform intervals, an endless conveyor carrying trays spaced uniformly along its length and moving along a closed path below said orifice, means for driving said slicing means and said conveyor at predetermined relative speeds, means operative to maintain a selected degree of tension in said conveyor longitudinally of the path thereof, and independent adjusting means for advancing and retarding the positions of the conveyor trays under said orifice to synchronize the operation of the slicing means with the operation of the conveyor for spotting sliced material on said trays as they pass below the slicing means.

16. In a machine of the character described, a supporting structure, an endless conveyor mounted on said structure for movement along a closed path, said conveyor comprising spaced, parallel traveling chains having a generally horizontal reach and a series of trays supported between said chains and spaced uniformly therealong, material feeding means mounted on said structure above said generally horizontal reach of said conveyor for dropping material at regular intervals for transportation on said trays, means for driving said conveyor and said material feeding means at predetermined relative speeds, and a conveyor guiding and adjusting mechanism comprising means for positively moving the location of at least one end of said reach in a horizontal direction to adjust the timing of the movement of the trays under said feeding means, and compensating means for deflecting said chains with a uniform pressure beyond said horizontal reach.

17. In a machine of the character described, a supporting structure, an endless conveyor mounted on said structure for movement along a closed path, said conveyor comprising spaced, parallel traveling chains and a series of trays supported therebetween and spaced uniformly therealong, material feeding means mounted on said structure above a generally horizontal reach of said conveyor for dropping material at regular intervals for transportation on said trays, means for driving said conveyor and said material feeding means at predetermined relative speeds, a first pair of coaxial sprockets at one end of said horizontal reach, said chains respectively passing around said first pair of sprockets through a substantial angle, means for positively moving said first pair of sprockets generally parallel to said horizontal reach for adjusting the timing of the movement of the trays under said material feeding means, a second pair of coaxial sprockets, said chains also respectively passing partially around said second pair of sprockets, a movable support for said second pair of sprockets, and counterbalance means for holding said second pair of sprockets against said chains with a constant pressure, whereby said second pair of sprockets will automatically move in compensating response to movement of said first pair of sprockets.

18. A conveyor chain positioning and guiding mechanism, comprising a continuous conveyor chain running along a closed path defined by a multiplicity of sprockets, three of said sprockets, arranged in sequence, being mounted on parallel axles disposed to produce substantially a right angle bend in the path of said chain as it passes around the intermediate one of said sequence of three sprockets, first means for positively moving said intermediate sprocket and its axle substantially parallel to the path of said chain immediately beyond said intermediate sprocket in one direction and transversely to the path of said chain immediately beyond said intermediate sprocket in the opposite direction, second means for independently and positively moving said intermediate sprocket and its axle substantially normal to the direction of movement thereof by said first means, and yieldable compensating means for maintaining said chain under substantially uniform tension as said intermediate sprocket is moved.

19. In a machine of the class described, means for feeding plastic material downwardly through an orifice, slicing means for severing and dropping slices of said material at uniform intervals, a continuous conveyor chain running under said orifice along a closed path defined by a multiplicity of sprockets, material receiving trays carried by and uniformly spaced along said chain for receiving material discharged from said orifice, means for driving said slicing means and said conveyor chain at predetermined relative speeds, three of said sprockets being arranged in sequence and mounted on parallel axles disposed to guide said chain along a substantially horizontal reach under said orifice and a generally vertical reach connected thereto by a bend in said path at the intermediate one of said three sprockets, means for positively moving said intermediate sprocket and its axle substantially parallel to said horizontal reach and transverse to said generally vertical reach to adjust the timing of the passage of said trays under said orifice, and yieldable compensating means for maintaining said chain under substantially uniform tension as said intermediate sprocket is moved.

20. The combination of claim 19 in which one of said multiplicity of sprockets other than said intermediate sprocket is disposed to produce a second bend in the path of said chain, said compensating means comprising a counterbalanced support for yieldably moving said one of said sprockets toward and away from the chain at said second bend as required to compensate for movement of said intermediate sprocket by said first means.

References Cited in the file of this patent

UNITED STATES PATENTS

| | | |
|---|---|---|
| Re. 10,691 | De Tamble | Feb. 23, 1886 |
| 252,931 | Eaton | Jan. 31, 1882 |
| 318,373 | Hayden | May 19, 1885 |
| 444,379 | Fowler | Jan. 6, 1891 |

(Other references on following page)

UNITED STATES PATENTS

| | | |
|---|---|---|
| 554,273 | Hueg | Feb. 11, 1896 |
| 643,037 | Bryan | Feb. 6, 1900 |
| 888,031 | Parrish | May 19, 1908 |
| 1,136,773 | Chapman | Apr. 20, 1915 |
| 1,285,720 | Jennings | May 26, 1918 |
| 1,312,525 | Du Brul | Aug. 12, 1919 |
| 1,472,445 | Van Esseltine | Oct. 30, 1923 |
| 1,871,054 | Hartley | Aug. 9, 1932 |
| 1,888,309 | Cramer | Nov. 22, 1932 |
| 1,900,607 | Kremmling | Mar. 7, 1933 |
| 2,162,145 | Werner | June 13, 1939 |
| 2,250,128 | Jeschke | July 22, 1941 |
| 2,257,758 | Murch | Oct. 7, 1941 |
| 2,488,046 | Werner et al. | Nov. 15, 1949 |
| 2,597,271 | Williams | May 20, 1952 |

FOREIGN PATENTS

| | | |
|---|---|---|
| 270,862 | Great Britain | May 19, 1927 |